(12) United States Patent
Dusterhoft

(10) Patent No.: US 8,720,571 B2
(45) Date of Patent: *May 13, 2014

(54) METHODS AND COMPOSITIONS RELATING TO MINIMIZING PARTICULATE MIGRATION OVER LONG INTERVALS

(75) Inventor: Ronald G. Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/903,952

(22) Filed: Sep. 25, 2007

(65) Prior Publication Data

US 2009/0078419 A1    Mar. 26, 2009

(51) Int. Cl.
*E21B 43/16*    (2006.01)
*E21B 33/13*    (2006.01)

(52) U.S. Cl.
USPC ..................... 166/305.1; 166/285

(58) Field of Classification Search
None
See application file for complete search history.

(56) References Cited

U.S. PATENT DOCUMENTS

| | | | |
|---|---|---|---|
| 3,329,204 A | 7/1967 | Brieger | |
| 3,487,877 A | 1/1970 | Methven | |
| 4,000,781 A * | 1/1977 | Knapp | 166/276 |
| 4,127,173 A * | 11/1978 | Watkins et al. | 166/276 |
| 4,585,064 A | 4/1986 | Graham et al. | 166/280.2 |
| 4,660,637 A | 4/1987 | McGill et al. | |
| 4,945,991 A * | 8/1990 | Jones | 166/278 |
| 5,375,661 A * | 12/1994 | Daneshy et al. | 166/278 |
| 5,833,000 A | 11/1998 | Weaver et al. | 166/276 |
| 5,839,510 A | 11/1998 | Weaver et al. | 166/276 |
| 5,853,048 A * | 12/1998 | Weaver et al. | 166/279 |
| 5,874,490 A | 2/1999 | Arora et al. | 523/414 |
| 6,059,032 A * | 5/2000 | Jones | 166/278 |
| 6,112,817 A | 9/2000 | Voll et al. | 166/370 |
| 6,311,773 B1 | 11/2001 | Todd et al. | 166/280 |
| 6,513,592 B2 | 2/2003 | Espin et al. | 166/295 |
| 6,582,819 B2 | 6/2003 | McDaniel | 428/402 |

(Continued)

FOREIGN PATENT DOCUMENTS

| | | |
|---|---|---|
| EP | 588421 | 3/1994 |
| WO | WO 02/075110 | 9/2002 |

(Continued)

OTHER PUBLICATIONS

Dusterhoft, et al., "Maximizing Effective Proppant Permeability under High-Stress, High Gas-Rate Conditions," Society of Petroleum Engineers, SPE 90398, page Nos., Sep. 26-29, 2004.

(Continued)

*Primary Examiner* — Angela M DiTrani
(74) *Attorney, Agent, or Firm* — McDermott Will & Emery LLP; Holly Soehnge

(57) ABSTRACT

Methods are included that are useful in treating subterranean formations and, more particularly, to minimizing particulate migration over long intervals in subterranean well bores that may be horizontal, vertical, deviated, or otherwise nonlinear. In one embodiment, a method is presented comprising: providing a well bore comprising an open hole section of about 30 feet or more that comprises an open hole section with a filter cake neighboring at least a portion of a reservoir; allowing the integrity of at least a portion of the filter cake to become compromised; and treating at least a portion of the open hole section with a consolidating agent system in a single stage operation so as to at least partially reduce particulate migration in the open hole section.

16 Claims, 12 Drawing Sheets

(56) References Cited

U.S. PATENT DOCUMENTS

| | | | |
|---|---|---|---|
| 6,622,794 B2 | 9/2003 | Zisk, Jr. | 166/373 |
| 6,632,778 B1 | 10/2003 | Ayoub et al. | |
| 6,653,436 B2 | 11/2003 | Back et al. | 528/335 |
| 6,677,426 B2 | 1/2004 | Noro et al. | 528/93 |
| 6,956,086 B2 | 10/2005 | Back et al. | 525/423 |
| 6,978,838 B2* | 12/2005 | Parlar et al. | 166/311 |
| 7,063,151 B2* | 6/2006 | Nguyen et al. | 166/280.2 |
| 7,100,686 B2 | 9/2006 | Wittrisch | 166/227 |
| 7,153,575 B2 | 12/2006 | Anderson et al. | 428/407 |
| 7,237,609 B2 | 7/2007 | Nguyen | |
| 7,265,079 B2* | 9/2007 | Willberg et al. | 507/203 |
| 7,431,098 B2* | 10/2008 | Ohmer et al. | 166/387 |
| 2003/0037925 A1* | 2/2003 | Walker et al. | 166/276 |
| 2004/0035579 A1* | 2/2004 | Parlar et al. | 166/278 |
| 2005/0034868 A1 | 2/2005 | Frost et al. | 166/307 |
| 2005/0059556 A1* | 3/2005 | Munoz et al. | 507/103 |
| 2005/0126785 A1 | 6/2005 | Todd | 166/307 |
| 2005/0274517 A1* | 12/2005 | Blauch et al. | 166/280.2 |
| 2006/0196661 A1* | 9/2006 | East et al. | 166/276 |
| 2006/0260810 A1 | 11/2006 | Weaver et al. | 166/278 |
| 2007/0131422 A1 | 6/2007 | Gatlin et al. | 166/280.1 |
| 2007/0131425 A1 | 6/2007 | Gatlin et al. | 166/280.2 |
| 2008/0139416 A1 | 6/2008 | Rimassa et al. | |
| 2008/0185158 A1 | 8/2008 | Chalker et al. | 166/387 |
| 2009/0294128 A1* | 12/2009 | Dale et al. | 166/306 |

FOREIGN PATENT DOCUMENTS

| | | |
|---|---|---|
| WO | WO 03/023177 A2 | 3/2003 |
| WO | WO 2006/116868 A1 | 5/2006 |
| WO | WO 2007/092082 A2 | 8/2007 |
| WO | WO 2007/092082 A3 | 8/2007 |

OTHER PUBLICATIONS

Bluch, et al., "New Insights into Proppant-Pack Damage Due to Infiltration of Formation Fines," Society of Petroleum Engineers, SPE 56833, page Nos., Oct. 3-6, 1999.

Rickman, et al., "Application of Curable Thin Films for Sand Control," Society of Petroleum Engineers, SPE 98228, page Nos., Feb. 15-17, 2006.

W. B. Bleakley, "Where we stand on sand consolidation," The Oil and Gas Journal, , page Nos. 87-93, Mar. 13, 1967.

Office Action dated May 2, 2008 from U.S. Appl. No. 11/903,814.

Search Report and Written Opinion for International Application No. PCT/GB2008/003154, Sep. 18, 2008.

Office Action dated Nov. 13, 2008 from U.S. Appl. No. 11/903,814.

Office Action for U.S. Appl. No. 11/903,814, dated Apr. 30, 2009.

Office Action for U.S. Appl. No. 11/903,814, dated Nov. 24, 2009.

Office Action for U.S. Appl. No. 11/903,814 dated Jun. 18, 2010.

Office Action for U.S. Appl. No. 11/903,814 dated Nov. 18, 2010.

Official Action for Chinese Patent Application No. 200880117166.4 dated Oct. 10, 2012.

Official Action for Chinese Patent Application 2014010800994250 dated Jan. 13, 2014.

\* cited by examiner

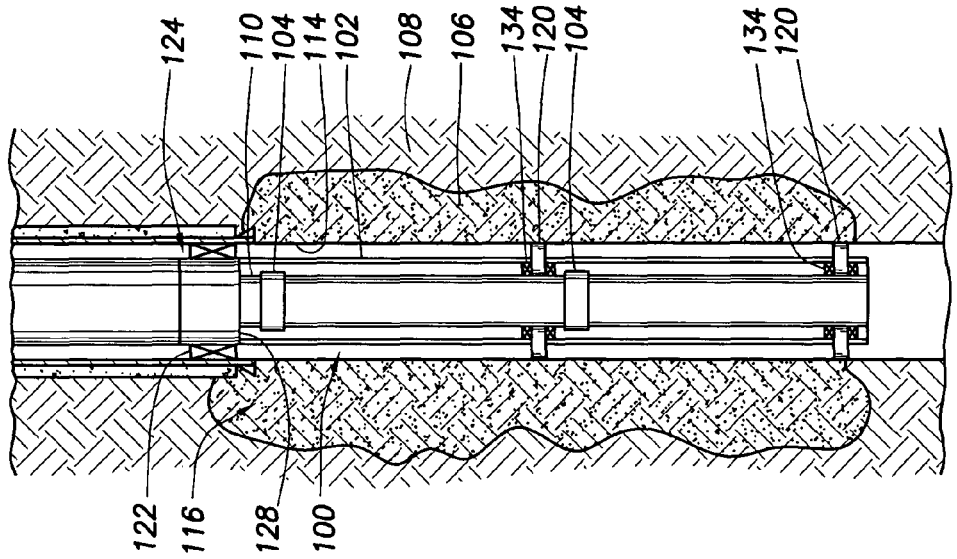
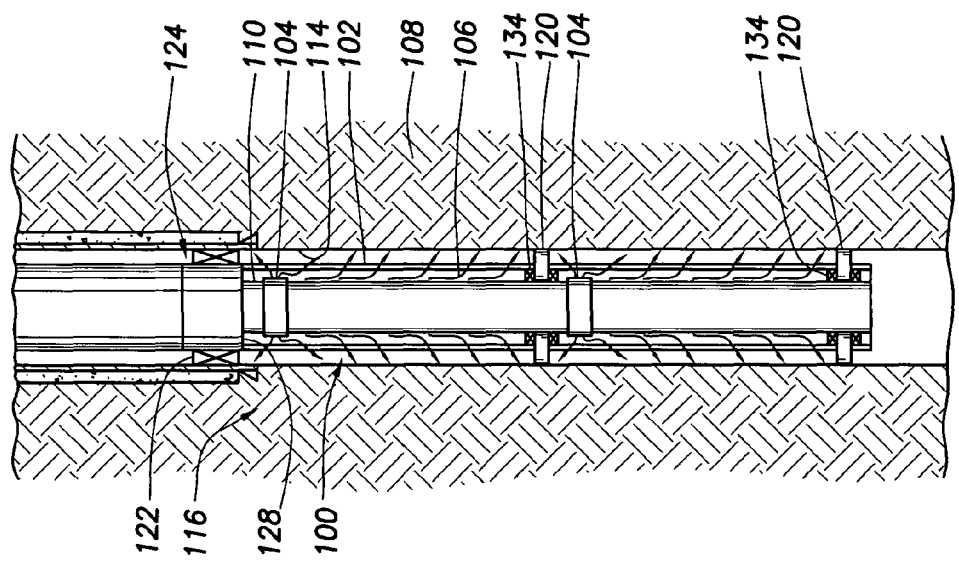

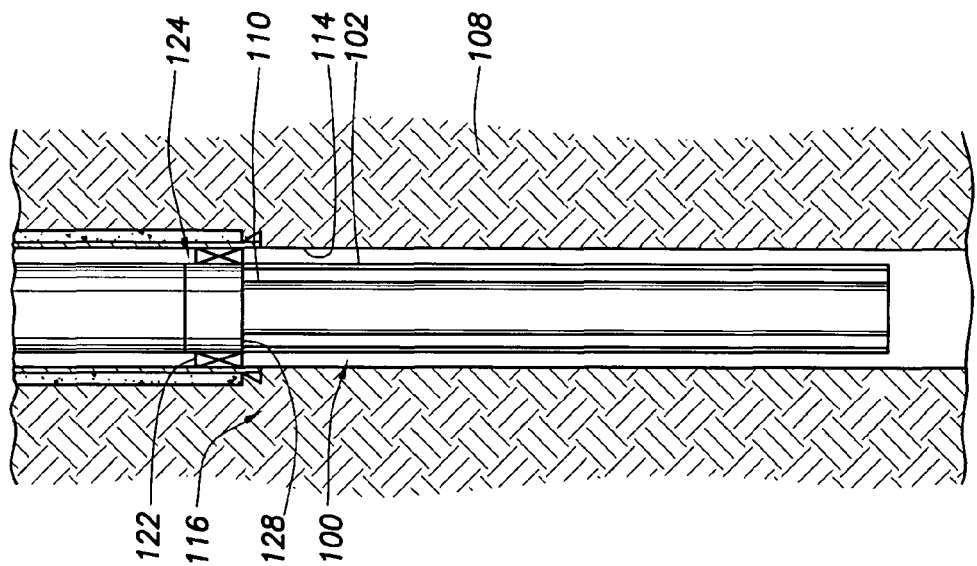
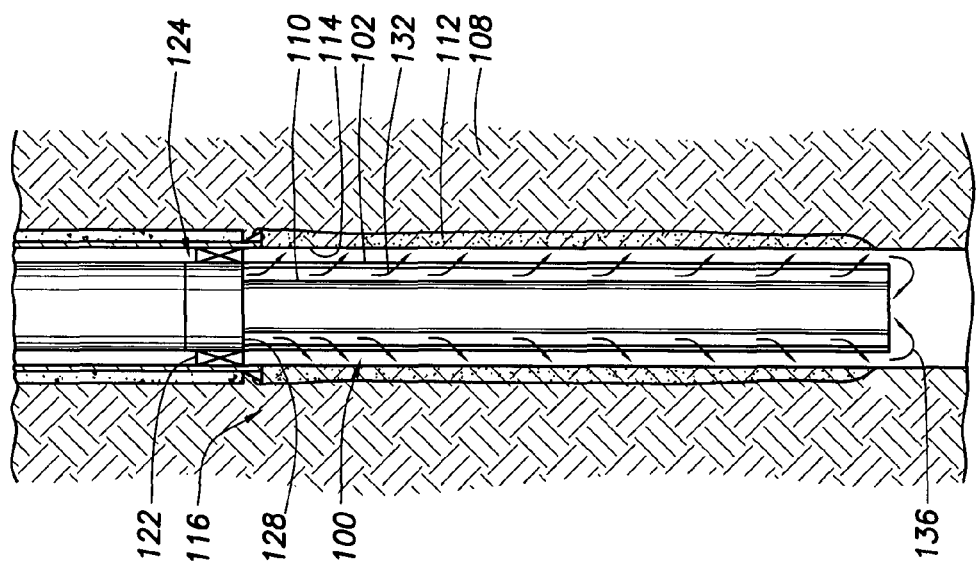

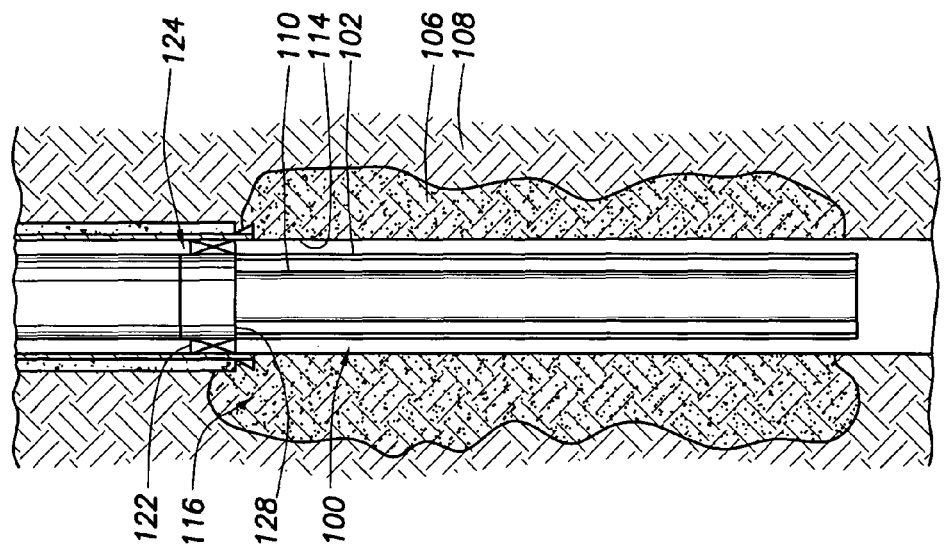
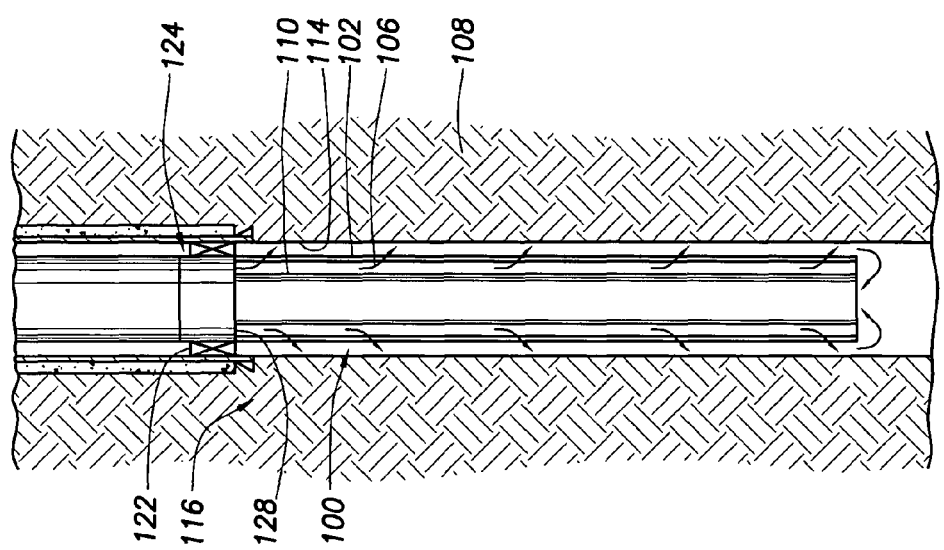

METHODS AND COMPOSITIONS RELATING TO MINIMIZING PARTICULATE MIGRATION OVER LONG INTERVALS

BACKGROUND

The present invention relates to methods, compositions, systems, and devices useful in treating subterranean formations and, more particularly, to consolidating potentially relatively unconsolidated portions of subterranean formations and minimizing the flowback of unconsolidated particulate materials such as formation fines and sand (referred to collectively herein as "particulate migration") over long intervals. More specifically, the present invention relates to methods for applying consolidating agent systems over at least a portion of a long interval in a subterranean well bore that may be horizontal, vertical, deviated, or otherwise nonlinear.

A type of particulate migration that may affect fluid conductivity in a subterranean formation is the flowback of unconsolidated particulate materials (e.g., formation fines, proppant particulates, etc.) through the conductive channels in the subterranean formation, which can, for example, clog or impair the conductive channels and/or damage the interior of the formation or equipment. Another issue that can negatively impact conductivity and further complicate the effects of particulate migration is the tendency of mineral surfaces in a subterranean formation to undergo chemical reactions caused, at least in part, by conditions created by mechanical stresses on those minerals (e.g., fracturing of mineral surfaces, compaction of mineral particulates, etc.). These reactions are referred herein to as "stress-activated reactions" or "stress-activated reactivity." The term "modifying the stress-activated reactivity of a mineral surface" and its derivatives as used herein refers to increasing or decreasing the tendency of a mineral surface in a subterranean formation to undergo one or more stress-activated reactions, or attaching a compound to the mineral surface that is capable of participating in one or more subsequent reactions with a second compound.

There are several techniques to control particulate migration and modify the stress-activated reactivity of mineral surfaces in a formation, some of which may involve the use of consolidating agent systems. The term "consolidating agent" or "consolidating agent system" (the terms may be used interchangeably) as used herein includes any compound or combination of compounds that is capable of reducing particulate migration in a subterranean formation and/or modifying the stress-activated reactivity of subterranean surfaces in a subterranean formation. Consolidating agent systems are thought to enhance or, in some instances, alter a subterranean formation's mechanical properties to prevent or reduce the potential for particulate migration and stress-activated reactivity, and perhaps providing relatively small increases in mechanical strength.

One method used to modify particulate migration parameters in some subterranean formations involves consolidating unconsolidated portions of subterranean formations into relatively stable permeable masses by applying a consolidating agent system to an unconsolidated portion of the formation. One example of such a method is applying a curable resin to a portion of a subterranean zone, followed by a spacer fluid, and then a catalyst that can activate the resin. Another example of such methods involves applying a tackifying composition (aqueous- or non-aqueous-based) to a portion of the formation in an effort to reduce the migration of particulates therein. Whereas a curable resin composition may produce relatively hard masses, the use of a tackifying composition produces more malleable consolidated masses.

While previously known consolidating agent systems are thought to be generally effective over short productive intervals (e.g., less than about 30 feet), effective placement of consolidation chemicals over heterogeneous long intervals has often proven time-consuming and difficult. The term "long interval" as used herein refers to an open hole section of about 30 feet or more in a subterranean well bore penetrating a subterranean formation. For example, some long vertical or deviated well intervals may be about 30 feet to about 100, 250, or 500 feet, and some long horizontal intervals may be about 500 feet to about 10,000 feet. Some may be longer.

Wells with longer production intervals are typically completed using cased hole or open hole gravel pack techniques. Such gravel pack techniques may involve placing a sand control screen to provide secondary filtration and mechanical support and a layer of uniformly graded gravel or sand between the formation and screen to act as a primary filtration layer, thus preventing particulate migration. These conventional gravel pack completions require large bore completions because of the need to install both screens and gravel, requiring long and complex pumping operations, which take additional rig time. The placement of the gravel in long horizontal intervals can also be complex if there are borehole quality or fluid loss problems. In many cases, alternate path technologies are used where additional space is required to attach shunt tubes on the outside of the screen to act as transport tubes to ensure complete gravel placement.

If a consolidating-agent-type of system is chosen, typical systems for placing chemicals over a long production interval may involve selective injection-type tools where a short section of the borehole is isolated, then treated with consolidating agents. The tools are then moved to the next interval and the process is repeated until the entire reservoir section has been treated. Such treatments may be referred to as multiple stage treatments. For long intervals, this process can be very time-consuming and complex as each injection step will require multiple fluid stages. Further, it is necessary to keep very accurate track of fluids in the tubulars through the entire treatment, which can be time-consuming and difficult. Such stepped treatments may take several days of rig time to complete. A single stage operation (i.e., one that does not require such multiple fluid stages to place the consolidating agent system over a long interval) could have fewer complications and take less rig time.

Filter cake (e.g., the residue deposited on the walls of a well bore by a fluid, usually a slurry, such as a drilling fluid) may control fluid loss and minimize formation damage during drilling and completion. Typical filter cakes may comprise bridging agents and in some instances, polymeric components, depending on the composition of the fluid used to form the filter cake. In typical sand control completions, a filter cake may stay intact until installation of a sand control completion.

While filter cakes may be beneficial, it is generally thought to be beneficial to remove filter cakes from producing zones once the well is placed into production. Generally, a filter cake is removed mechanically or chemically, or by allowing it to degrade with produced fluids. One method for degrading filter cakes from producing formations involves including an acid-soluble particulate bridging agent for bridging over the formation pores in the drilling, fracturing, gravel transport, or other servicing fluid that forms the filter cake. Such an acid-soluble filter cake could then be degraded by placing a strong acid solution in contact with the filter cake and allowing that solution to remain in contact for a period of time sufficient to degrade the filter cake by at least interacting with the acid-soluble bridging agents.

One consideration in degrading a deposited filter cake from a subterranean well bore formation often involves the timing of such degradation. For instance, in situations where sand control of the formation is a concern, a filter cake is thought to offer some degree of control over unconsolidated particulates in the subterranean formation while placing the gravel pack. For example, if the filter cake is removed prior to gravel packing, the unconsolidated particulates may migrate, and as a result, well bore stability problems may arise that may cause collapse of the well bore, thus preventing the installation of a gravel pack. Additionally, loss of filter cake integrity can also result in severe losses of fluid during completion operations or gravel displacement, creating well control problems or the inability to effectively place gravel across the entire interval. While installing the screen and placing the gravel before degrading the filter cake may help control unconsolidated particulates, prevent undesirable losses of well bore fluids, and maintain borehole stability, as a result the filter cake itself may be more difficult to degrade. In such instances, the screen and gravel may represent a physical barrier between the filter cake on walls of the well bore and the filter cake degradation fluid used to degrade the filter cake.

An additional problem that may affect long production intervals that often needs to be managed is the presence of shale. Shale can be problematic because it can generate a large volume of fines. Oftentimes, it may be desirable to physically isolate portions of the subterranean formation that contain shale to prevent the production of such fines. In some instances, shale may be isolated with blank pipe (e.g., pipe that does not comprise slots or other holes on its exterior surface oriented to the well bore walls). Exposed shale may be hydraulically isolated by placing blank pipe across these intervals and isolating the annulus using open hole packers. Conventional mechanical, hydraulic, hydrostatic, inflatable, or swelling elastomer packers may provide annular isolation for this purpose. Some examples of open hole packers include WIZARD® III Packer and SWELLPACKER™, both of which are available from Halliburton Energy Services, Inc. in Carrollton, Tex.

Effective treatment of long intervals can be further complicated by variable reservoir properties such as porosity, permeability, and pore pressure. The term "reservoir" as used herein refers to a subsurface body of rock having sufficient porosity and permeability to store and transmit fluids such as gas, oil, or water. For instance, a long interval may include variable high permeability portions. In some situations, high permeability portions may act as thief zones taking the bulk of the treatment fluids, where low permeability, higher pressured zones may not accept any of the treatment fluids. Chemical diversion techniques are often used in stimulation treatments and are focused on plugging the high perm zones to help force fluid flow into the low perm zones. Uniform placement of treating fluids under these conditions and using these solutions can be difficult and unreliable. As used herein, the term "treatment," or "treating," refers to any subterranean operation performed in conjunction with a desired function and/or for a desired purpose. The term "treatment," or "treating," does not imply any particular action. As used herein, the term "treatment fluid" refers to any fluid that may be used in a subterranean application in conjunction with a desired function and/or for a desired purpose. The term "treatment fluid" does not imply any particular action by the fluid or any component thereof.

SUMMARY

The present invention relates to methods, compositions, systems, and devices useful in treating subterranean formations and, more particularly, to consolidating potentially relatively unconsolidated portions of subterranean formations and minimizing particulate migration over long intervals. More specifically, the present invention relates to methods for applying consolidating agent systems over at least a portion of a long interval in a subterranean well bore that may be horizontal, vertical, deviated, or otherwise nonlinear.

In one embodiment, the present invention provides a method comprising: providing a well bore comprising an open hole section of about 30 feet or more that comprises a filter cake neighboring at least a portion of a reservoir in a subterranean formation; placing a flow distribution system in the open hole section, the flow distribution system comprising a plurality of annular barriers; compromising the integrity of the filter cake; activating at least one of the annular barriers; and placing a consolidating agent system into the formation to at least partially reduce particulate migration in the open hole section.

In one embodiment, the present invention provides a method comprising: providing a well bore comprising an open hole section of about 30 feet or more that comprises a filter cake neighboring at least a portion of a reservoir; allowing the integrity of at least a portion of the filter cake to become compromised; and treating at least a portion of the open hole section with a consolidating agent system in a single stage operation so as to at least partially reduce particulate migration in the open hole section.

In one embodiment, the present invention provides a method comprising: providing a well bore comprising an open hole section of about 30 feet or more that comprises a filter cake neighboring a reservoir; allowing the integrity of the filter cake to become compromised; and placing a consolidating agent system into the formation in a single stage operation so as to at least partially reduce particulate migration in a portion of the open hole section.

In one embodiment, the present invention provides a method comprising: providing a well bore comprising an open hole section of about 30 feet or more having a filter cake neighboring at least a portion of a reservoir in a subterranean formation; placing a flow distribution system in the open hole section, the flow distribution system comprising: a flow distributor; a borehole support assembly; a suspension tool; and a service assembly comprising a flow positioner; allowing the integrity of the filter cake to become compromised; removing the service assembly from the well bore; installing completion tubing; and placing a consolidating agent system into the formation to at least partially reduce particulate migration in the open hole section.

In one embodiment, the present invention provides a method comprising: drilling a well bore in a subterranean formation, the well bore comprising an open hole section of about 30 feet or more that comprises a filter cake neighboring at least a portion of a reservoir in the formation; placing a flow distribution system in the open hole section, the flow distribution system comprising: a borehole support assembly; a suspension tool; and a service assembly comprising a flow positioner; allowing the integrity of the filter cake to become compromised; removing the service assembly from the well bore; installing completion tubing; placing a consolidating agent system into the formation to at least partially reduce particulate migration in the open hole section; and placing the well in service.

In one embodiment, the present invention provides a method comprising: providing a well bore comprising an open hole section that comprises a filter cake neighboring at least a portion of a reservoir in a formation; placing a flow distribution system in the open hole section, the flow distribution system comprising: a borehole support assembly; a suspension tool; and a service assembly comprising a flow positioner; allowing the integrity of the filter cake to become compromised; placing a consolidating agent system into the formation to at least partially reduce particulate migration in the open hole section; removing the service assembly from the well bore; installing completion tubing; and placing the well in service.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 2c is a side view of the embodiment of FIG. 2a, after a filter cake has been compromised and annular barriers have activated, showing placement of a consolidating agent system.

FIG. 2d is a side view of the embodiment of FIG. 2a, after placement of the consolidating agent system.

FIG. 3b is side view of the embodiment of FIG. 3a, showing placement of a filter cake degradation fluid.

FIG. 3c is a side view of the embodiment of FIG. 3a, after a filter cake has been compromised.

FIG. 3d is a side view of the embodiment of FIG. 3a, showing placement of a consolidating agent system.

FIG. 3e is a side view of the embodiment of FIG. 3a, after placement of the consolidating agent system.

DETAILED DESCRIPTION

Figure 1A:
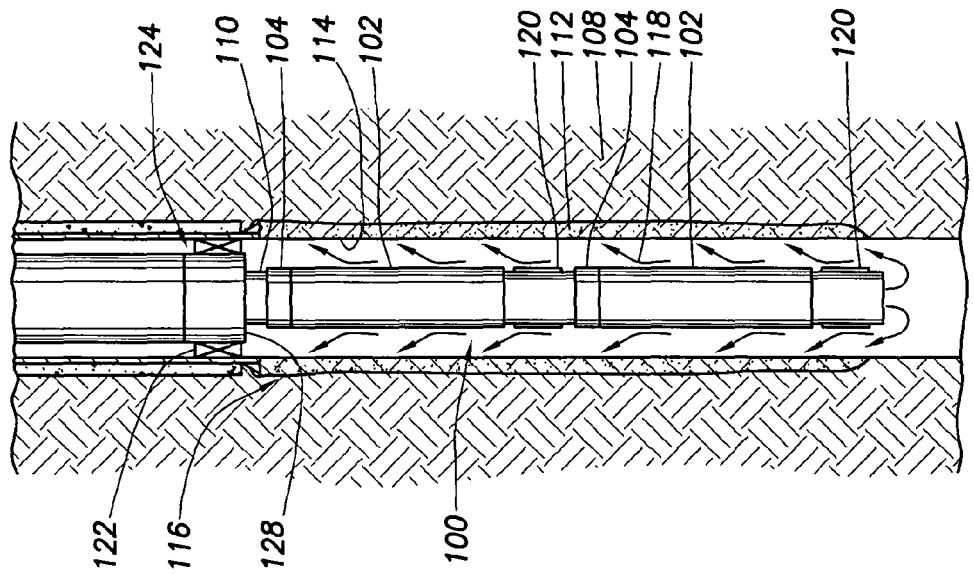
FIG. 1a is a side view showing one embodiment of a flow distribution system within a well bore.

The present invention relates to methods, compositions, systems, and devices useful in treating subterranean formations and, more particularly, to consolidating potentially relatively unconsolidated portions of subterranean formations and minimizing particulate migration over long intervals. More specifically, the present invention relates to methods for applying consolidating agent systems over at least a portion of a long interval in a subterranean well bore that may be horizontal, vertical, deviated, or otherwise nonlinear.

The methods of the present invention may be applicable to horizontal, vertical, deviated, or otherwise nonlinear well bores in any type of subterranean formation. The methods may be applicable to injection wells as well as production wells, including hydrocarbon wells. One of the many potential advantages of the methods of the present invention (many of which are not discussed or eluded to herein) is that consolidating agent systems may be placed over at least a portion of a long interval of an open hole section to at least partially control particulate migration, which otherwise may negatively impact the conductivity of the formation. Referring generally to the Figures, in some embodiments, a consolidating agent system may be placed, covering an entire or a majority of a desired interval in a single stage. In some embodiments, single stage placement may be possible via flow distribution system 100, which limits flow out of any one point of the screen or other borehole support assembly 102, thus providing what is considered to be effective treatment over a relatively long interval.

As used herein, the term "open hole section" refers to any portion of a well bore that is either uncased or is perforated. This may include, but is not limited to an uncased section following a cased section, or a perforated section.

With reference to the figures in some instances, in some embodiments, the methods of the present invention may assist in placing consolidating agent system 106, which may include any suitable consolidating agent system (e.g., those discussed below). This placement can be used for relative uniform or near-uniform placement of the consolidating agent systems over at least a portion of a long interval of an open hole section to provide at least some degree of particulate migration control. Examples of uniform or near-uniform placement include, but are not limited to, when a consolidating agent is placed into the reservoir around the well bore at a chosen minimum depth of placement along an entire chosen interval (e.g., a depth of equal to or greater than ½ well bore diameter). Some intervals may be around 30 feet or more up to in excess of 10,000 feet as dictated by the ability to drill longer intervals. Any length of interval between these is disclosed herein. Using the methods of the present invention, in some embodiments, well bore tubulars, casing, liners, slotted liners, pre-drilled liners, perforated liners, or screens can be used to provide borehole support. Additionally, at least in some embodiments, these methods provided herein may make it possible to eliminate gravel pack treatments, which may help to simplify the system architecture and installation procedures, possibly saving rig time and expense.

In one embodiment, the present invention provides a method comprising: providing a well bore comprising an open hole section of about 30 feet or more that comprises a filter cake neighboring at least a portion of a reservoir in a subterranean formation; placing a flow distribution system in the open hole section, the flow distribution system comprising a plurality of annular barriers; compromising the integrity of the filter cake; activating at least one of the annular barriers; and placing a consolidating agent system into the formation to at least partially reduce particulate migration in the open hole section.

In one embodiment, the present invention provides a method comprising: providing a well bore comprising an open hole section of about 30 feet or more that comprises a filter cake neighboring at least a portion of a reservoir; allowing the integrity of at least a portion of the filter cake to become compromised; and treating at least a portion of the open hole section with a consolidating agent system in a single stage operation so as to at least partially reduce particulate migration in the open hole section.

In one embodiment, the present invention provides a method comprising: providing a well bore comprising an open hole section of about 30 feet or more that comprises a filter cake neighboring a reservoir; allowing the integrity of the filter cake to become compromised; and placing a consolidating agent system into the formation in a single stage operation so as to at least partially reduce particulate migration in a portion of the open hole section.

In one embodiment, the present invention provides a method comprising: providing a well bore comprising an open hole section of about 30 feet or more having a filter cake neighboring at least a portion of a reservoir in a subterranean formation; placing a flow distribution system in the open hole section, the flow distribution system comprising: a flow distributor; a borehole support assembly; a suspension tool; and a service assembly comprising a flow positioner; allowing the integrity of the filter cake to become compromised; removing the service assembly from the well bore; installing completion tubing; and placing a consolidating agent system into the formation to at least partially reduce particulate migration in the open hole section.

In one embodiment, the present invention provides a method comprising: drilling a well bore in a subterranean formation, the well bore comprising an open hole section of about 30 feet or more that comprises a filter cake neighboring at least a portion of a reservoir in the formation; placing a flow distribution system in the open hole section, the flow distribution system comprising: a borehole support assembly; a suspension tool; and a service assembly comprising a flow positioner; allowing the integrity of the filter cake to become compromised; removing the service assembly from the well bore; installing completion tubing; placing a consolidating agent system into the formation to at least partially reduce particulate migration in the open hole section; and placing the well in service.

In one embodiment, the present invention provides a method comprising: providing a well bore comprising an open hole section that comprises a filter cake neighboring at least a portion of a reservoir in a formation; placing a flow distribution system in the open hole section, the flow distribution system comprising: a borehole support assembly; a suspension tool; and a service assembly comprising a flow positioner; allowing the integrity of the filter cake to become compromised; placing a consolidating agent system into the formation to at least partially reduce particulate migration in the open hole section; removing the service assembly from the well bore; installing completion tubing; and placing the well in service.

A filter cake may be placed on the surfaces of the subterranean formation by a drilling fluid, a drill-in fluid, or another suitable fluid as a result of drilling the well bore. Filter cakes can also be deposited in a cased and perforated well or open hole well by the use of fluid loss pills containing solids and/or polymer solutions that will bridge off and form a filter cake as the fluid leaks into the formation. The components of the filter cake may vary depending on the composition of the drilling fluid, drill-in fluid, or a fluid loss remediation treatment (e.g., a fluid loss pill). Thus, the method used to compromise the integrity of the filter cake should vary.

Referring to the figures for nonlimiting illustrations of certain aspects of some of the methods of the present invention, flow distribution system 100 may be a bottom hole assembly or any other device or system for delivering material into the well. In some embodiments, flow distribution system 100 may be an integral part of a conventional sand control screen. Alternatively, flow distribution system 100 may be installed with wash pipe 110, allowing flow exiting wash pipe 110 to be evenly distributed along the length of the interval for uniform treatment. Flow distribution system 100 with consolidation may increase feasibility of slim bore sand control completions, even in very highly productive wells.

Referring now to the exemplary embodiments of FIGS. 1a-1h, flow distribution system 100 is illustrated in well bore 114. The well associated with well bore 114 may be for production or for injection. For example, after being treated with consolidating agent system 106 (shown in FIGS. 1e-1h), well bore 114 may produce hydrocarbons. Well bore 114 may have open hole section 116. Open hole section 116 may have filter cake 112 in place prior to placement of flow distribution system 100. Filter cake 112 and/or open hole section 116 may neighbor reservoir 108. Reservoir 108 may comprise oil, gas, other hydrocarbons, or other materials for which production is desired. Reservoir 108 may comprise water or other aqueous fluids as well. Alternatively, reservoir 108 may be used to store or otherwise inject material.

Depending on the particular device(s) selected, flow distribution system 100 may include flow distributor 104, borehole support assembly 102, optional annular barriers 120, suspension tool 122, and service assembly 124. Flow distribution system 100 may also include optional fluid loss valve 126. Flow distribution system 100 may be placed in well bore 114 via any of a number of devices and/or systems. For example, flow distribution system 100 may be run into well bore 114 on tubing (e.g., production tubing). Other options for placing flow distribution system 100 include a work string, a drill string, a coiled tubing string, or any other means for placing tools into well bores. Flow distribution system 100 may be assembled at the surface and may include blank pipe and annular barriers 120 to isolate exposed shale in the open hole section 116. Wash pipe 110, suspension tool 122, fluid loss valve 126, and borehole support assembly 102 may allow spotting and circulation of fluids. After flow distribution system 100 is assembled, it may be placed in open hole section 116 of well bore 114, and suspension tool 122 may be set.

If included, flow distributor 104 may be any device associated with a formation to well bore flow path, which can cause a pressure drop sufficiently high relative to the overall pressure drop along the length of well bore 114 that results in substantially uniform flow distribution amongst the formation to well bore flow paths along the length of the well. Flow distributor 104 may be any of a number of different devices, including, but not limited to, an inflow control device, an outflow control device, a port or other orifice, a shunt tube, a poppet valve, a choke, a tortuous path, a nozzle-type device, a helix-type device, or a tube-type device. Alternatively, a series of nozzles and/or tubes may be used to achieve the desired pressure loss. Flow distributor 104 may also include one or more infinitely variable control valves or variable control valves that may be controlled mechanically, hydraulically, or electronically. Any device capable of selectively passing material therethrough may be suitable for use as flow distributor 104, for example, EQUIFLOW™ screens, available from Halliburton Energy Services, Inc. in Duncan, Okla. Flow distributor 104 may also be an adjustable flow path inflow control device or a combination of an inflow control device and another device. For adjustable flow, flow distributor 104 may have a number of positions, including full open flow, injection control, and production control of unwanted fluids. To further enhance the performance of flow distribution system 100, flow distributor 104 may include two or more ports. One or more of the ports may be fitted with a one-way check valve so that flow distributor 104 will allow for improved diversion prior to completion of the well, and may act as an inflow control device equalizing flow with less pressure drop during production. Flow distributor may be part of service assembly 124, removed with wash pipe 110, or it may stay in place.

If included, borehole support assembly 102 may be used in combination with wash pipe 110 or independently to support, filter, or isolate. For example, borehole support assembly 102 may prevent sand-out or collapse of the borehole by providing structural support if the formation plastically fails and conforms to the shape of assembly. Alternatively, borehole support assembly 102 may prevent formation material from entering production. In another application, borehole support assembly 102 may isolate to avoid undesirable areas, such as shale. While borehole support assembly 102 is shown as a screen, it may alternatively be a slotted liner, a perforated pipe, or a blank pipe, for example.

Optional annular barriers 120 may be annular isolation devices that provide at least some degree of isolation, which may be useful for uniform application of fluids. Annular barriers 120 may be activated by any of a number of different methods, depending on the specific type. For example, annular barriers 120 may activate hydrostatically, hydraulically, mechanically, inflatably, or via contact with an activating material. In one embodiment, annular barriers 120 may be swell packers that activate upon contact with a particular fluid. In some embodiments, the annular isolation device responds to a fluid present within the subterranean formation to substantially isolate at least a portion of the open hole section. Swell packers are relatively simple to install, generally have no operational requirement and a relatively long seal area that can seal in bad hole conditions, and they are thought to be highly reliable. In one embodiment, the particular fluid for activating the swell packers may be filter cake degradation fluid 118 (discussed below). This allows annular barriers 120 to activate around the same time as filter cake 112 degrades. Since filter cake degradation fluid 118 may activate swell packers, it may contain additives to cause this reaction to occur more rapidly. Hydraulic or hydrostatic packers may be used in conjunction with swell packers to eliminate waiting time associated with swell packers. This may be particularly useful when valuable rig time is spent waiting on swell packers to set.

As further discussed below, self-diverting fluids may be used as an alternative to an annular barrier to better distribute the flow of the consolidating agent system within the well bore, for example. Self-diverting fluids are thought to allow a circulation squeeze approach to ensure contact with well bore 114, without the need for mechanical or other traditional annular barriers 120. If, however, annular barriers 120 are still used, they may not activate until after the well is in service. The use of self-diverting fluid 132 may allow for the omission of flow distributors 104, as discussed below with respect to FIGS. 3a-3g. Self-diverting fluid 132 may be any of a number of fluids capable of acting as diverting fluids. Suitable examples include any known self-diverting fluid such as foamed fluids with 50% to 90% quality (gas content) or shear thinning gelled fluids such as xanthan gel systems or other such polymeric systems. An example of a self-diverting fluid is a 50%-to-90%-quality nitrogen foam. Some commercially available examples of suitable diverting fluids include AQUALINEAR™ or LO-GUARD™ (available from Halliburton Energy Services, Inc. in Duncan, Okla.).

If included, as illustrated, suspension tool 122 should at least partially support borehole support assembly 102 in well bore 114. Suspension tool 122 may be a packer, a screen hanger, a liner hanger assembly, a gravel pack packer, or any other such supporting device.

Service assembly 124 may be part of flow distribution system 100 and can be used to service the well prior to placing it in production. One exemplary embodiment of service assembly 124, as illustrated in FIGS. 1a-1h, includes flow positioner 128 and may include wash pipe 110. Flow positioner 128 may be any device to selectively position flow. Flow positioner 128 may be a multi-positioning tool, a crossover tool, or any other device allowing selective passage. For example, a VERSA-TRIEVE® Packer/Multi-Position Tool (available from Halliburton Energy Services, Inc. in Carrollton, Tex.) may be used in multiple configurations. For example, in the squeeze position, this flow positioner establishes flow paths necessary to squeeze fluid into the formation. In upper and lower circulating positions, this flow positioner circulates fluid across the formation interval, through borehole support assembly 102, then back up the tubing/casing annulus. In the reverse circulating position, this flow positioner circulates reverse fluids down the annulus and back up the tubing. It can also be used to circulate down the tubing to spot fluid in place. Generally, raising and lowering the multi-position tool relative to suspension tool 122 provides these changes of flow path.

If included, wash pipe 110 provides a temporary internal conduit, and may include cup packers 134 (shown in FIGS. 2a-2g) for selective injection, preventing cross flow in the annulus. While wash pipe 110 is shown in some illustrated embodiments, it may be omitted in other embodiments.

If included, fluid loss valve 126 may prevent fluid loss in alternative embodiments such as when service assembly 124 is not present in well bore 114. The fluid loss valve 126 may be any of a number of valves, including, but not limited to, a ceramic flapper valve.

Figure 1B:
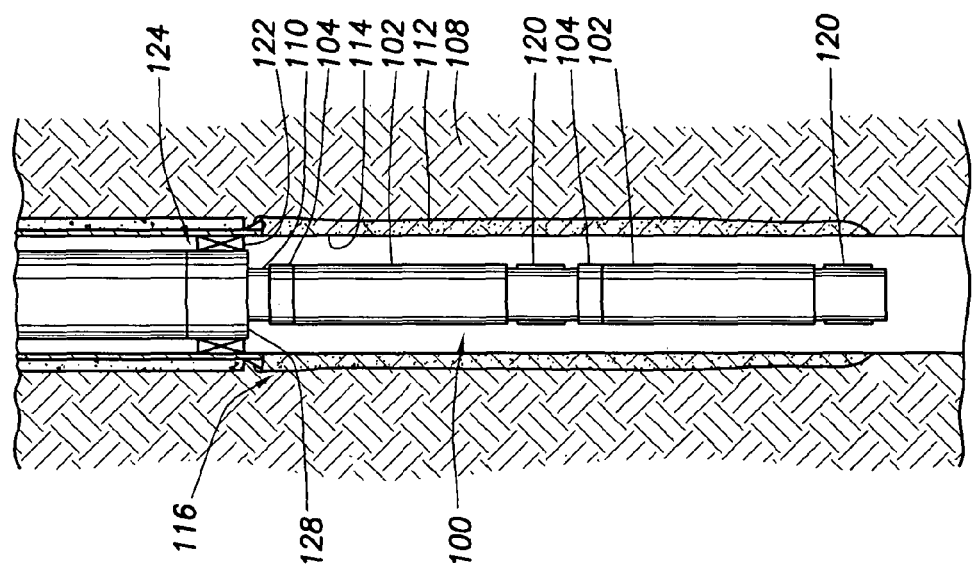
FIG. 1b is side view of the embodiment of FIG. 1a, showing placement of a filter cake degradation fluid.
Figure 1C:
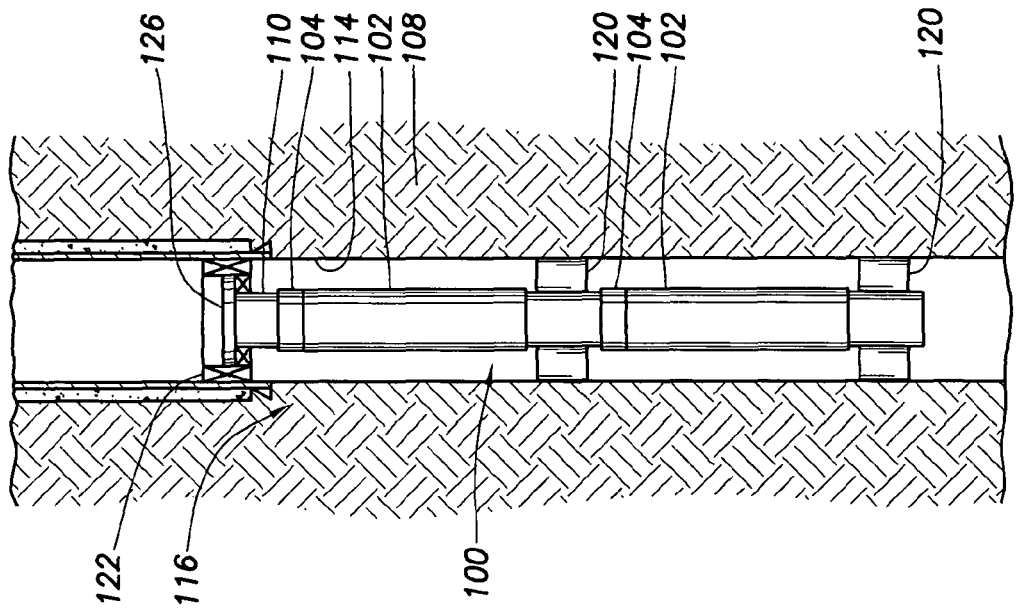
FIG. 1c is a side view of the embodiment of FIG. 1a, after a service assembly has been removed from the well bore.
Figure 1D:
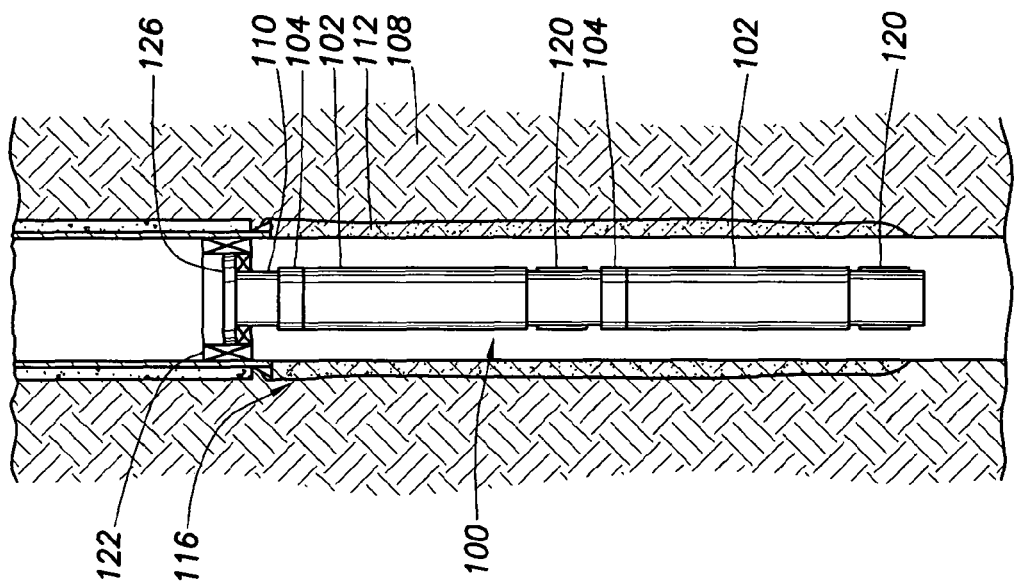
FIG. 1d is a side view of the embodiment of FIG. 1a, after a filter cake has been compromised, and annular barriers have activated.

According to the illustrated embodiment, flow distribution system 100 may be placed in open hole section 116 and can be used for a number of operations. For example, flow distribution system 100 may first be used in a method aimed at compromising the integrity of filter cake 112, as illustrated in FIGS. 1b-1d. This may involve placing a filter cake degradation fluid 118 in contact with filter cake 100. As illustrated in FIG. 1b, in some embodiments, filter cake degradation fluid 118 may be pumped down through wash pipe 110, and into the annulus, allowing filter cake degradation fluid 118 to contact filter cake 112. Over time, filter cake degradation fluid 118 may react with filter cake 112, causing filter cake 112 to become less effective at preventing fluids from interacting with the subterranean formation. Thinning and/or holes may form in filter cake 112, thus allowing fluids to pass through the formation more easily. This process is generally termed herein as "compromising the integrity of the filter cake" or "degrading the filter cake." The term does not imply any particular degree of compromise or degradation.

Filter cake degradation fluid 118 may have certain characteristics, depending on the composition of the filter cake. In some embodiments, filter cake degradation fluid 118 may not be necessary, for example, where the filter cake is largely self-degrading. If the filter cake largely comprises acid-soluble bridging agents, such as calcium carbonate, then the filter cake degradation fluid 118 should comprise an acid or an acid precursor capable of interacting with those acid-soluble bridging agents in such a way as to compromise the integrity of the filter cake in a desirable manner. Alternatively, or in addition to such acids, if the filter cake comprises a polymeric component (e.g., a polymeric component corresponding to gelling agent polymers found in the drilling fluid such as xanthan, guar, cellulose derivatives, synthetic polymers, and the like), materials capable of degrading those polymers should be included in filter cake degradation fluid 118. These may include oxidizers or bases, or even some enzymes in certain situations. In some embodiments, filter cake degradation fluid 118 may be an aqueous fluid.

Filter cake degradation fluid 118 may comprise an acid precursor that generates an acid that may be capable of interacting with acid-soluble portions in the filter cake. U.S. Pat. No. 7,140,438, the relevant portion of which is herein incorporated by reference, describes one such system utilizing acids generated from orthoesters to degrade filter cake components. Suitable filter cake degradation fluids for filter cake degradation fluid 118 include, but are not limited to, delayed acid release systems (e.g., N-FLOW™, available from Halliburton Energy Services, Inc. in Duncan, Okla.); delayed release acid systems having a chemical trigger for predetermined delays in degrading the filter cake, which may be advantageous in certain circumstances (e.g., ACCU-BREAK®, available from Halliburton Energy Services, Inc. in Duncan, Okla.); oil-based acid systems (e.g., OSA™, available from Halliburton Energy Services, Inc. in Duncan, Okla.); slow-reacting oil soluble acid systems for oil-based or aqueous-based drilling or drill-in fluids; acid solutions; enzyme solutions; and base solutions; or combinations of these systems; and derivatives of these systems. One example of filter cake degradation fluid 118 is a fluid comprising an oil soluble acid, which includes a slow-reacting organic acid that can perform multiple functions. The acid may remove calcium carbonate and help break any polymer used in filter cake 112. Additionally, the oil base fluid may activate annular barriers 120.

Other examples of suitable methods and compositions for compromising the integrity of a filter cake are described in U.S. Pat. No. 7,195,068, the relevant disclosure of which is incorporated by reference. Methods are described therein of degrading a filter cake comprising an acid-soluble portion and a polymeric portion in a subterranean formation comprising the steps of: introducing a filter cake degradation composition comprising a delayed-release acid component and a delayed-release oxidizer component to a well bore penetrating the subterranean formation; allowing the delayed-release acid component to release an acid derivative and the delayed-release oxidizer component to release an acid-consuming component; allowing the acid-consuming component to interact with the acid derivative to delay a reaction between at least a portion of the acid derivative and at least a portion of the acid-soluble portion of the filter cake and to produce hydrogen peroxide; allowing the acid derivative to degrade at least a portion of the acid-soluble portion of the filter cake after a delay period; and allowing the hydrogen peroxide to degrade at least a portion of the polymeric portion of the filter cake. Other methods of compromising the integrity of a filter cake are disclosed in U.S. Patent Application Publication Nos. 2007/0078064, 2006/0105917, 2006/0105918, and 2006/0205608, the relevant disclosures of which are hereby incorporated by reference.

In some embodiments, the filter cake may be self-degrading, in that it comprises self-degrading bridging agents. Such self-degrading bridging agents usually comprise a degradable material. Examples of self-degrading bridging agents include, but are not limited to, those comprising: ortho esters (which may be referred to as ortho ethers); poly(orthoesters) (which may be referred to as poly(ortho ethers); aliphatic polyesters; lactides; poly(lactides); glycolides; poly(glycolides); poly($\alpha$-caprolactone); poly(hydroxybutyrate); substantially water-insoluble anhydrides; poly(anhydrides); and poly(amino acids). Other self-degrading bridging agents may be suitable as well.

In some embodiments, the annular barriers may be activated before the integrity of the filter cake becomes substantially compromised.

In the embodiment of FIGS. 1*a*-1*h*, fluid loss valve 126 may be activated (e.g., closed) as service assembly 124 is removed, or it may be activated afterward. FIG. 1*c* illustrates flow distribution system 100 after removal of service assembly 124 and activation of fluid loss valve 126, but before filter cake degradation fluid 118 has had time to react with filter cake 112 and annular barriers 120. While the embodiments of FIGS. 1*a*-1*h* illustrate filter cake degradation fluid 118, it may be omitted in other embodiments. FIG. 1*d* illustrates flow distribution system 100 after some time has passed, such that filter cake 112 has been compromised and annular barriers 120 have activated. In some embodiments, these reactions occur within the time it takes for the service assembly 124 to be removed and the completion tubing 130 to be installed. Thus, little or no additional wait time would be required before pumping consolidating agent system 106 into the formation. Alternatively, filter cake 112 and annular barriers 120 may react without filter cake degradation fluid 118. For example, annular barriers 120 activate upon exposure to hydrocarbons in well bore 114. Filter cake 112 may comprise a sufficient concentration of self-degrading bridging agents, and therefore, filter cake degradation fluid 118 may not be required. One of ordinary skill in the art, with the benefit of this disclosure, will recognize whether filter cake degradation fluid 118 is needed and, if so, what its composition should be based on the composition of the filter cake at issue.

In the embodiment of FIGS. 1*a*-1*h*, as soon as service assembly 124 is removed, completion tubing 130 and upper completion equipment may be installed. Completion tubing 130 may be any type of tubular suitable for use in completing a well. For example, completion tubing 130 may include a number of pipe joints or it may include coiled tubing. Installation of completion tubing 130 may cause fluid loss valve 126 to rupture, such that it deactivates simultaneously with installation of completion tubing 130. Alternatively, pressure or any other means may deactivate fluid loss valve 126 at any time.

Figure 1E:
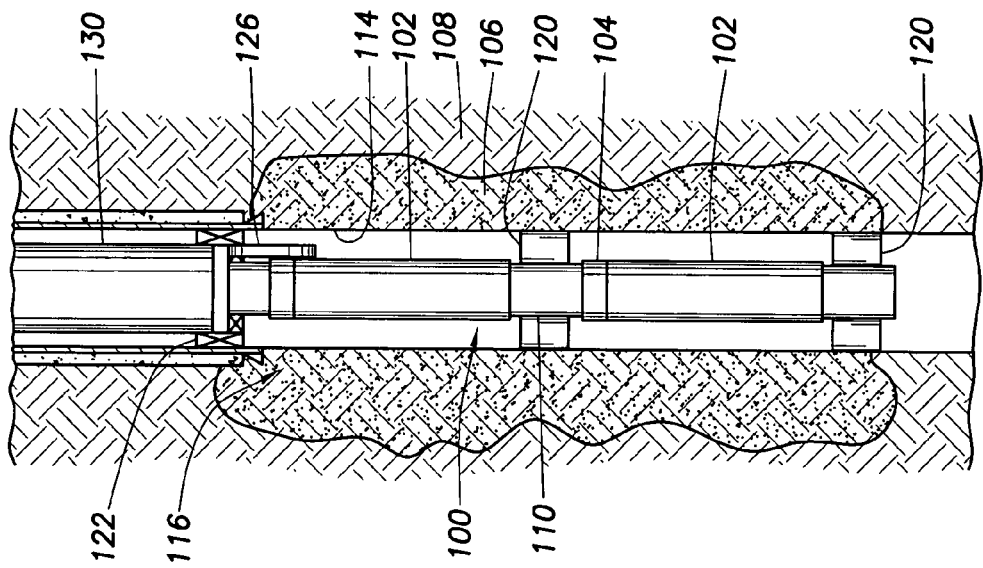
FIG. 1e is a side view of the embodiment of FIG. 1a, with completion tubing in place, showing placement of a consolidating agent system.

As illustrated in FIG. 1*e*, consolidating agent system 106 may be placed by pumping down through completion tubing and out through flow distribution system 100, using borehole support assembly 102 to equalize flow over the entire desired interval length. Consolidating agent system 106 may be overdisplaced, and time may be allowed for it to cure or react prior to placing the well in service.

Consolidating agent system 106 may comprise any suitable consolidating agent system that is useful for controlling particulate migration to the desired degree. The consolidating agent system, in some embodiments, enables consolidation to occur only at the points of contact between particles. For example, in some embodiments, the materials will attach to the particulates and not fill or seal the porosity of the formation (e.g., resins, tackifiers, silyl-modified polyamide compounds, crosslinkable aqueous polymer compositions, consolidating agent emulsions, polymerizable organic monomer compositions, and the like). Optionally, consolidating agent system 106 may include pre-flush and/or a post-flush step.

In some embodiments, it may be desirable to utilize a pre-flush fluid prior to the placement of the consolidating agent in a subterranean formation, inter alia, to remove excess fluids from the pore spaces in the subterranean formation, to clean the subterranean formation, etc. Examples of suitable pre-flush fluids include, but are not limited to, aqueous fluids, solvents, and surfactants capable of altering the wetability of the formation surface. Examples of suitable pre-flush solvents may include mutual solvents such as MUSOL® and N-VER-SPERSE A™, both commercially available from Halliburton Energy Services, Inc., of Duncan, Okla. An example of a suitable pre-flush surfactant may also include an ethoxylated nonylphenol phosphate ester such as ES-5™, which is commercially available from Halliburton Energy Services, Inc., of Duncan, Okla. Additionally, in those embodiments where the consolidating agent comprises a resin composition, it may be desirable to include a hardening agent in a pre-flush fluid.

Additionally, in some embodiments, it may be desirable to utilize a post-flush fluid subsequent to the placement of the consolidating agent in a subterranean formation, inter alia, to displace excess consolidating agent from the near well bore region. Examples of suitable post-flush fluids include, but are not limited to, aqueous fluids, surfactants, solvents, or gases (e.g., nitrogen), or any combination thereof. Additionally, in some embodiments, in may be desirable to include a hardening agent in the post-flush fluid. For example, certain types of resin compositions, including, but not limited to, furan-based resins, urethane resins, and epoxy-based resins, may be catalyzed with a hardening agent placed in a post-flush fluid.

The consolidating agents suitable for use in the methods of the present invention generally comprise any compound that is capable of minimizing particulate migration and/or modifying the stress-activated reactivity of surfaces in subterranean formations. In some embodiments, the consolidating agent may comprise a consolidating agent chosen from the group consisting of: non-aqueous tackifying agents; aqueous tackifying agents; resins; silyl-modified polyamide compounds; crosslinkable aqueous polymer compositions; and consolidating agent emulsions. Combinations of these also may be suitable.

The type and amount of consolidating agent included in a particular method of the invention may depend upon, among other factors, the composition and/or temperature of the subterranean formation, the chemical composition of formations fluids, the flow rate of fluids present in the formation, the effective porosity and/or permeability of the subterranean formation, pore throat size and distribution, and the like. Furthermore, the concentration of the consolidating agent can be varied, inter alia, to either enhance bridging to provide for a more rapid coating of the consolidating agent or to minimize bridging to allow deeper penetration into the subterranean formation. It is within the ability of one skilled in the art, with the benefit of this disclosure, to determine the type and amount of consolidating agent to include in the methods of the present invention to achieve the desired results.

The consolidating agents suitable for use in the methods of the present invention may be provided in any suitable form, including in a particle form, which may be in a solid form and/or a liquid form. In those embodiments where the consolidating agent is provided in a particle form, the size of the particle can vary widely. In some embodiments, the consolidating agent particles may have an average particle diameter of about 0.01 micrometers ("$\mu m$") to about 300 $\mu m$. In some embodiments, the consolidating agent particles may have an average particle diameter of about 0.01 $\mu m$ to about 100 $\mu m$. In some embodiments, the consolidating agent particles may have an average particle diameter of about 0.01 $\mu m$ to about 10 $\mu m$. The size distribution of the consolidating agent particles used in a particular composition or method of the invention may depend upon several factors, including, but not limited to, the size distribution of the particulates present in the subterranean formation, the effective porosity and/or permeability of the subterranean formation, pore throat size and distribution, and the like.

In some embodiments, it may be desirable to use a consolidating agent particle with a size distribution such that the consolidating agent particles are placed at contact points between formation particulates. For example, in some embodiments, the size distribution of the consolidating agent particles may be within a smaller size range, e.g., of about 0.01 $\mu m$ to about 10 $\mu m$. It may be desirable in some embodiments to provide consolidating agent particles with a smaller particle size distribution, inter alia, to promote deeper penetration of the consolidating agent particles through a body of unconsolidated particulates or in low permeability formations.

In other embodiments, the size distribution of the consolidating agent particles may be within a larger range, e.g. of about 30 $\mu m$ to about 300 $\mu m$. It may be desirable in some embodiments to provide consolidating agent particles with a larger particle size distribution, inter alia, to promote the filtering out of consolidating agent particles at or near the spaces between neighboring unconsolidated particulates or in high permeability formations. A person of ordinary skill in the art, with the benefit of this disclosure, will be able to select an appropriate particle size distribution for the consolidating agent particles suitable for use in the present invention and will appreciate that methods of creating consolidating agent particles of any relevant size are well known in the art.

In some embodiments of the present invention, the consolidating agent may comprise a non-aqueous tackifying agent. A particularly preferred group of non-aqueous tackifying agents comprises polyamides that are liquids or in solution at the temperature of the subterranean formation such that they are, by themselves, nonhardening when introduced into the subterranean formation. A particularly preferred product is a condensation reaction product comprised of a commercially available polyacid and a polyamine. Such commercial products include compounds such as mixtures of dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well. Such acid compounds are commercially available from companies such as Union Camp, Chemtall, and Emery Industries. The reaction products are available from, for example, Champion Technologies, Inc.

Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Other suitable non-aqueous tackifying agents are described in U.S. Pat. Nos. 5,853,048 and 5,833,000, both issued to Weaver, et al., and U.S. Patent Publication Nos. 2007/0131425 and 2007/0131422, the relevant disclosures of which are herein incorporated by reference.

Non-aqueous tackifying agents suitable for use in the present invention may either be used such that they form a nonhardening coating on a surface or they may be combined with a multifunctional material capable of reacting with the non-aqueous tackifying agent to form a hardened coating. A "hardened coating" as used herein means that the reaction of the tackifying compound with the multifunctional material should result in a substantially non-flowable reaction product that exhibits a higher compressive strength in a consolidated agglomerate than the tackifying compound alone with the particulates. In this instance, the non-aqueous tackifying agent may function similarly to a hardenable resin.

Multifunctional materials suitable for use in the present invention include, but are not limited to, aldehydes; dialdehydes such as glutaraldehyde; hemiacetals or aldehyde releasing compounds; diacid halides; dihalides such as dichlorides and dibromides; polyacid anhydrides; epoxides; furfuraldehyde; aldehyde condensates; and silyl-modified polyamide compounds; and the like; and combinations thereof. Suitable silyl-modified polyamide compounds that may be used in the present invention are those that are substantially self-hardening compositions capable of at least partially adhering to a surface or to a particulate in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments of the present invention, the multifunctional material may be mixed with the tackifying compound in an amount of about 0.01% to about 50% by weight of the tackifying compound to effect formation of the reaction product. In other embodiments, the multifunctional material is present in an amount of about 0.5% to about 1% by weight of the tackifying compound. Suitable multifunctional materials are described in U.S. Pat. No. 5,839,510 issued to Weaver, et al., the relevant disclosure of which is herein incorporated by reference.

Aqueous tackifying agents suitable for use in the present invention are usually not generally significantly tacky when placed onto a particulate, but are capable of being "activated" (e.g., destabilized, coalesced and/or reacted) to transform the compound into a sticky, tackifying compound at a desirable time. Such activation may occur before, during, or after the aqueous tackifier agent is placed in the subterranean formation. In some embodiments, a pretreatment may be first contacted with the surface of a particulate to prepare it to be coated with an aqueous tackifier agent. Suitable aqueous tackifying agents are generally charged polymers that comprise compounds that, when in an aqueous solvent or solution, will form a nonhardening coating (by itself or with an activator) and, when placed on a particulate, will increase the continuous critical resuspension velocity of the particulate when contacted by a stream of water. The aqueous tackifier agent may enhance the grain-to-grain contact between the individual particulates within the formation (be they proppant particulates, formation fines, or other particulates), helping bring about the consolidation of the particulates into a cohesive, flexible, and permeable mass.

Suitable aqueous tackifying agents include any polymer that can bind, coagulate, or flocculate a particulate. Also, polymers that function as pressure-sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers; derivatives thereof, and combinations thereof. The term "derivative" as used herein refers to any compound that is made from one of the listed compounds, for example, by replacing one atom in the base compound with another atom or group of atoms. Methods of determining suitable aqueous tackifying agents and additional disclosure on aqueous tackifying agents can be found in U.S. patent application Ser. No. 10/864,061, filed Jun. 9, 2004 and U.S. patent application Ser. No. 10/864,618, filed Jun. 9, 2004, the relevant disclosures of which are hereby incorporated by reference.

Some suitable tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% C1-30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl (meth)acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique. Methods of producing these copolymers are disclosed, for example, in U.S. Pat. No. 4,670,501, the relevant disclosure of which is incorporated herein by reference.

In some embodiments of the present invention, the consolidating agent may comprise a resin. The term "resin" as used herein refers to any of numerous physically similar polymerized synthetics or chemically modified natural resins including thermoplastic materials and thermosetting materials. Resins that may be suitable for use in the present invention may include substantially all resins known and used in the art.

One type of resin suitable for use in the methods of the present invention is a two-component epoxy-based resin comprising a liquid hardenable resin component and a liquid hardening agent component. The liquid hardenable resin component comprises a hardenable resin and an optional solvent. The solvent may be added to the resin to reduce its viscosity for ease of handling, mixing and transferring. It is within the ability of one skilled in the art, with the benefit of this disclosure, to determine if and how much solvent may be needed to achieve a viscosity suitable to the subterranean conditions. Factors that may affect this decision include geographic location of the well, the surrounding weather conditions, and the desired long-term stability of the consolidating agent. An alternate way to reduce the viscosity of the hardenable resin is to heat it. The second component is the liquid hardening agent component, which comprises a hardening agent, an optional silane coupling agent, a surfactant, an optional hydrolyzable ester for, among other things, breaking gelled fracturing fluid films on proppant particulates, and an optional liquid carrier fluid for, among other things, reducing the viscosity of the hardening agent component.

Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and combinations thereof. In some embodiments, the hardenable resin may comprise a urethane resin. Examples of suitable urethane resins may comprise a polyisocyanate component and a polyhydroxy component. Examples of suitable hardenable resins, including urethane resins, that may be suitable for use in the methods of the present invention include those described in U.S. Pat. No. 6,582,819, issued to McDaniel, et al.; U.S. Pat. No. 4,585,064 issued to Graham, et al.; U.S. Pat. No. 6,677,426 issued to Noro, et al.; and U.S. Pat. No. 7,153,575 issued to Anderson, et al., the relevant disclosures of which are herein incorporated by reference.

The hardenable resin may be included in the liquid hardenable resin component in an amount in the range of about 5% to about 100% by weight of the liquid hardenable resin component. It is within the ability of one skilled in the art, with the benefit of this disclosure, to determine how much of the liquid hardenable resin component may be needed to achieve the desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and combinations thereof. Other preferred solvents may include aqueous dissolvable solvents such as, methanol, isopropanol, butanol, and glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, and hexoxyethanol, and isomers thereof. Selection of an appropriate solvent is dependent on the resin composition chosen and is within the ability of one skilled in the art, with the benefit of this disclosure.

As described above, use of a solvent in the liquid hardenable resin component is optional but may be desirable to reduce the viscosity of the hardenable resin component for ease of handling, mixing, and transferring. However, as previously stated, it may be desirable in some embodiments to not use such a solvent for environmental or safety reasons. It is within the ability of one skilled in the art, with the benefit of this disclosure, to determine if and how much solvent is needed to achieve a suitable viscosity. In some embodiments, the amount of the solvent used in the liquid hardenable resin component may be in the range of about 0.1% to about 30% by weight of the liquid hardenable resin component. Optionally, the liquid hardenable resin component may be heated to reduce its viscosity, in place of, or in addition to, using a solvent.

Examples of the hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; and 2-ethyl-4-methyl imidazole; and combinations thereof. The chosen hardening agent often effects the range of temperatures over which a hardenable resin is able to cure. By way of example, and not of limitation, in subterranean formations having a temperature of about 60° F. to about 250° F., amines and cyclo-aliphatic amines such as piperidine, triethylamine, tris(dimethylaminomethyl) phenol, and dimethylaminomethyl)phenol may be preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 50° F. to as high as about 350° F.

The hardening agent used may be included in the liquid hardening agent component in an amount sufficient to at least partially harden the resin composition. In some embodiments of the present invention, the hardening agent used is included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the consolidating agent may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present in the water. In other embodiments, the liquid hardenable resin component may be emulsified in water and the liquid hardening agent component may be provided separately. Similarly, in other embodiments, both the liquid hardenable resin component and the liquid hardening agent component may both be emulsified in water.

The optional silane coupling agent may be used, among other things, to act as a mediator to help bond the resin to formation particulates or proppant particulates. Examples of suitable silane coupling agents include, but are not limited to, N-2-(aminoethyl)-3-aminopropyltrimethoxysilane, and 3-glycidoxypropyltrimethoxysilane, and combinations thereof. The silane coupling agent may be included in the resin component or the liquid hardening agent component (according to the chemistry of the particular group as determined by one skilled in the art with the benefit of this disclosure). In some embodiments of the present invention, the silane coupling agent used is included in the liquid hardening agent component in the range of about 0.1% to about 3% by weight of the liquid hardening agent component.

Any surfactant compatible with the hardening agent and capable of facilitating the coating of the resin onto particulates in the subterranean formation may be used in the liquid hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. The surfactant or surfactants that may be used are included in the liquid hardening agent component in an amount in the range of about 1% to about 10% by weight of the liquid hardening agent component.

While not required, examples of hydrolyzable esters that may be used in the liquid hardening agent component include, but are not limited to, a mixture of dimethylglutarate, dimethyladipate, and dimethylsuccinate; dimethylthiolate; methyl salicylate; dimethyl salicylate; and dimethylsuccinate; and combinations thereof. When used, a hydrolyzable ester is included in the liquid hardening agent component in an amount in the range of about 0.1% to about 3% by weight of the liquid hardening agent component. In some embodiments a hydrolyzable ester is included in the liquid hardening agent component in an amount in the range of about 1% to about 2.5% by weight of the liquid hardening agent component.

Use of a diluent or liquid carrier fluid in the liquid hardening agent component is optional and may be used to reduce the viscosity of the liquid hardening agent component for ease of handling, mixing, and transferring. As previously stated, it may be desirable in some embodiments to not use such a solvent for environmental or safety reasons. Any suitable carrier fluid that is compatible with the liquid hardening agent component and achieves the desired viscosity effects is suitable for use in the present invention. Some suitable liquid carrier fluids are those having high flash points (e.g., about 125° F.) because of, among other things, environmental and safety concerns; such solvents include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, and fatty acid methyl esters, and combinations thereof. Other suitable liquid carrier fluids include aqueous dissolvable solvents such as, for example, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol having at least one $C_1$ to $C_6$ alkyl group, mono ethers of dihydric alkanols, methoxypropanol, butoxyethanol, and hexoxyethanol, and isomers thereof. Combinations of these may be suitable as well. Selection of an appropriate liquid carrier fluid is dependent on, inter alia, the resin composition chosen.

Other resins suitable for use in the present invention are furan-based resins. Suitable furan-based resins include, but are not limited to, furfuryl alcohol resins, furfural resins, mixtures furfuryl alcohol resins and aldehydes, and a mixture of furan resins and phenolic resins. Of these, furfuryl alcohol resins may be preferred. A furan-based resin may be combined with a solvent to control viscosity if desired. Suitable solvents for use in the furan-based consolidation fluids of the present invention include, but are not limited to, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred. In some embodiments, the furan-based resins suitable for use in the present invention may be capable of enduring temperatures well in excess of 350° F. without degrading. In some embodiments, the furan-based resins suitable for use in the present invention are capable of enduring temperatures up to about 700° F. without degrading.

Optionally, the furan-based resins suitable for use in the present invention may further comprise a curing agent, inter alia, to facilitate or accelerate curing of the furan-based resin at lower temperatures. The presence of a curing agent may be particularly useful in embodiments where the furan-based resin may be placed within subterranean formations having temperatures below about 350° F. Examples of suitable curing agents include, but are not limited to, organic or inorganic acids, such as, inter alia, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. In those embodiments where a curing agent is not used, the furan-based resin may cure autocatalytically.

Still other resins suitable for use in the methods of the present invention are phenolic-based resins. Suitable phenolic-based resins include, but are not limited to, terpolymers of phenol, phenolic formaldehyde resins, and a mixture of phenolic and furan resins. In some embodiments, a mixture of phenolic and furan resins may be preferred. A phenolic-based resin may be combined with a solvent to control viscosity if desired. Suitable solvents for use in the present invention include, but are not limited to butyl acetate, butyl lactate, furfuryl acetate, and 2-butoxy ethanol. Of these, 2-butoxy ethanol may be preferred in some embodiments.

Yet another resin-type material suitable for use in the methods of the present invention is a phenol/phenol formaldehyde/furfuryl alcohol resin comprising of about 5% to about 30% phenol, of about 40% to about 70% phenol formaldehyde, of about 10% to about 40% furfuryl alcohol, of about 0.1% to about 3% of a silane coupling agent, and of about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, and 3-glycidoxypropyltrimethoxysilane. Suitable surfactants include, but are not limited to, an ethoxylated nonyl phenol phosphate ester, mixtures of one or more cationic surfactants, and one or more nonionic surfactants and an alkyl phosphonate surfactant.

In some embodiments, resins suitable for use in the consolidating agent emulsion compositions of the present invention may optionally comprise filler particles. Suitable filler particles may include any particle that does not adversely react with the other components used in accordance with this invention or with the subterranean formation. Examples of suitable filler particles include silica, glass, clay, alumina, fumed silica, carbon black, graphite, mica, meta-silicate, calcium silicate, calcine, kaoline, talc, zirconia, titanium dioxide, fly ash, and boron, and combinations thereof. In some embodiments, the filler particles may range in size of about 0.01 μm to about 100 μm. As will be understood by one skilled in the art, particles of smaller average size may be particularly useful in situations where it is desirable to obtain high proppant pack permeability (i.e., conductivity), and/or high consolidation strength. In certain embodiments, the filler particles may be included in the resin composition in an amount of about 0.1% to about 70% by weight of the resin composition. In other embodiments, the filler particles may be included in the resin composition in an amount of about 0.5% to about 40% by weight of the resin composition. In some embodiments, the filler particles may be included in the resin composition in an amount of about 1% to about 10% by weight of the resin composition. Some examples of suitable resin compositions comprising filler particles are described in U.S. Ser. No. 11/482,601, issued to Rickman, et al., the relevant disclosure of which is herein incorporated by reference.

Silyl-modified polyamide compounds suitable for use in the consolidating agent systems of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, issued to Matherly, et al., the relevant disclosure of which is herein incorporated by reference.

In other embodiments, the consolidating agent systems of the present invention comprise crosslinkable aqueous polymer compositions. Generally, suitable crosslinkable aqueous polymer compositions comprise an aqueous solvent, a crosslinkable polymer, and a crosslinking agent. Such compositions are similar to those used to form gelled treatment fluids, such as fracturing fluids, but according to the methods of the present invention, they are not exposed to breakers or de-linkers, and so they retain their viscous nature over time. The aqueous solvent may be any aqueous solvent in which the crosslinkable composition and the crosslinking agent may be dissolved, mixed, suspended, or dispersed therein to facilitate gel formation. For example, the aqueous solvent used may be freshwater, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. The most suitable polymers are thought to be those that would absorb or adhere to the rock surfaces so that the rock matrix may be strengthened without occupying a lot of the pore space and/or reducing permeability. Examples of suitable acrylamide-containing polymers include polyacrylamide, partially hydrolyzed polyacrylamide, copolymers of acrylamide and acrylate, and carboxylate-containing terpolymers and tetrapolymers of acrylate. Combinations of these may be suitable as well. Additional examples of suitable crosslinkable polymers include hydratable polymers comprising polysaccharides and derivatives thereof, and that contain one or more of the monosaccharide units, galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Combinations of these may be suitable as well. Suitable hydratable synthetic polymers and copolymers that may be used in the crosslinkable aqueous polymer compositions include, but are not limited to, polycarboxylates such as polyacrylates and polymethacrylates; polyacrylamides; methylvinyl ether polymers; polyvinyl alcohols; and polyvinylpyrrolidone. Combinations of these may be suitable as well. The crosslinkable polymer used should be included in the crosslinkable aqueous polymer composition in an amount sufficient to form the desired gelled substance in the subterranean formation. In some embodiments of the present invention, the crosslinkable polymer may be included in the crosslinkable aqueous polymer composition in an amount in the range of from about 1% to about 30% by weight of the aqueous solvent. In another embodiment of the present invention, the crosslinkable polymer may be included in the crosslinkable aqueous polymer composition in an amount in the range of from about 1% to about 20% by weight of the aqueous solvent.

The crosslinkable aqueous polymer compositions of the present invention further comprise a crosslinking agent for crosslinking the crosslinkable polymers to form the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions of the present invention in an amount sufficient to provide, among other things, the desired degree of crosslinking. In some embodiments of the present invention, the crosslinking agent may be present in the crosslinkable aqueous polymer compositions of the present invention in an amount in the range of from about 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agent derived from guar, guar derivatives, or cellulose derivatives. The crosslinking delaying agent may be included in the crosslinkable aqueous polymer compositions, among other things, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

In other embodiments, the consolidating agent systems of the present invention comprise polymerizable organic monomer compositions. Generally, suitable polymerizable organic monomer compositions comprise an aqueous-base fluid, a water-soluble polymerizable organic monomer, an oxygen scavenger, and a primary initiator.

The aqueous-based fluid component of the polymerizable organic monomer composition generally may be freshwater, salt water, brine, seawater, or any other aqueous liquid that does not adversely react with the other components used in accordance with this invention or with the subterranean formation.

A variety of monomers are suitable for use as the water-soluble polymerizable organic monomers in the present invention. Examples of suitable monomers include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethylaminopropylmethacryl-amide, methacrylamidepropyltriethylammonium chloride, N-vinyl pyrrolidone, vinyl-phosphonic acid, and methacryloyloxyethyl trimethylammonium sulfate, and combinations thereof. In some embodiments, the water-soluble polymerizable organic monomer should be self-crosslinking. Examples of suitable monomers which are thought to be self crosslinking include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene gylcol acrylate, and polypropylene glycol methacrylate, and combinations thereof. Of these, hydroxyethylacrylate may be preferred in some instances. An example of a particularly suitable monomer is hydroxyethyl-cellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some embodiments of the present invention, the water-soluble polymerizable organic monomer may be included in the polymerizable organic monomer composition in an amount in the range of from about 1% to about 30% by weight of the aqueous-base fluid. In another embodiment of the present invention, the water-soluble polymerizable organic monomer may be included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be predissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of the present invention in an amount in the range of from about 0.005% to about 0.1% by weight of the polymerizable organic monomer composition.

A primary initiator may be used, among other things, to initiate polymerization of the water-soluble polymerizable organic monomer(s). Any compound or compounds that form free radicals in aqueous solution may be used as the primary initiator. The free radicals act, among other things, to initiate polymerization of the water-soluble polymerizable organic monomer present in the polymerizable organic monomer composition. Compounds suitable for use as the primary initiator include, but are not limited to, alkali metal persulfates; peroxides; oxidation-reduction systems employing reducing agents, such as sulfites in combination with oxidizers; and azo polymerization initiators. Suitable azo polymerization initiators include 2,2'-azobis(2-imidazole-2-hydroxyethyl) propane, 2,2'-azobis(2-aminopropane), 4,4'-azobis(4-cyanovaleric acid), and 2,2'-azobis(2-methyl-N-(2-hydroxyethyl)propionamide. Generally, the primary initiator should be present in the polymerizable organic monomer composition in an amount sufficient to initiate polymerization of the water-soluble polymerizable organic monomer(s). In certain embodiments of the present invention, the primary initiator may be present in the polymerizable organic monomer composition in an amount in the range of from about 0.1% to about 5% by weight of the water-soluble polymerizable organic monomer(s). One skilled in the art, with the benefit of this disclosure, will recognize that as the polymerization temperature increases, the required level of activator decreases.

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments of the present invention, the secondary initiator is present in the polymerizable organic monomer composition in an amount in the range of from about 0.1% to about 5% by weight of the water-soluble polymerizable organic monomer(s).

Also optionally, the polymerizable organic monomer compositions of the present invention may further comprise a crosslinking agent for crosslinking the polymerizable organic monomer compositions in the desired gelled substance. In some embodiments, the crosslinking agent is a molecule or complex containing a reactive transition metal cation. A suitable crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

Other suitable consolidating agent systems are described in U.S. Pat. Nos. 6,196,317, 6,192,986 and 5,836,392, the relevant disclosures of which are incorporated by reference herein.

In other embodiments, the consolidating agent systems of the present invention may comprise a consolidating agent emulsion that comprises an aqueous fluid, an emulsifying agent, and a consolidating agent. The consolidating agent in suitable emulsions may be either a nonaqueous tackifying agent or a resin, such as those described above. These consolidating agent emulsions have an aqueous external phase and organic-based internal phase. The term "emulsion" and any derivatives thereof as used herein refers to a mixture of two or more immiscible phases and includes, but is not limited to, dispersions and suspensions.

Suitable consolidating agent emulsions comprise an aqueous external phase comprising an aqueous fluid. Suitable aqueous fluids that may be used in the consolidating agent emulsions of the present invention include freshwater, salt water, brine, seawater, or any other aqueous fluid that, preferably, does not adversely react with the other components used in accordance with this invention or with the subterranean formation. One should note, however, that if long-term stability of the emulsion is desired, a more suitable aqueous fluid may be one that is substantially free of salts. It is within the ability of one skilled in the art, with the benefit of this disclosure, to determine if and how much salt may be tolerated in the consolidating agent emulsions of the present invention before it becomes problematic for the stability of the emulsion. The aqueous fluid may be present in the consolidating agent emulsions in an amount in the range of about 20% to 99.9% by weight of the consolidating agent emulsion composition. In some embodiments, the aqueous fluid may be present in the consolidating agent emulsions in an amount in the range of about 60% to 99.9% by weight of the consolidating agent emulsion composition. In some embodiments, the aqueous fluid may be present in the consolidating agent emulsions in an amount in the range of about 95% to 99.9% by weight of the consolidating agent emulsion composition.

The consolidating agent in the emulsion may be either a nonaqueous tackifying agent or a resin, such as those described above. The consolidating agents may be present in a consolidating agent emulsion in an amount in the range of about 0.1% to about 80% by weight of the consolidating agent emulsion composition. In some embodiments, the consolidating agent may be present in a consolidating agent emulsion in an amount in the range of about 0.1% to about 40% by weight of the composition. In some embodiments, the consolidating agent may be present in a consolidating agent emulsion in an amount in the range of about 0.1% to about 5% by weight of the composition.

As previously stated, the consolidating agent emulsions comprise an emulsifying agent. Examples of suitable emulsifying agents may include surfactants, proteins, hydrolyzed proteins, lipids, glycolipids, and nanosized particulates, including, but not limited to, fumed silica. Combinations of these may be suitable as well.

Surfactants that may be used in suitable consolidating agent emulsions are those capable of emulsifying an organic-based component in an aqueous-based component so that the emulsion has an aqueous external phase and an organic internal phase. In some embodiments, the surfactant may comprise an amine surfactant. Such suitable amine surfactants include, but are not limited to, amine ethoxylates and amine ethoxylated quaternary salts such as tallow diamine and tallow triamine exthoxylates and quaternary salts. Examples of suitable surfactants are ethoxylated $C_{12}$-$C_{22}$ diamine, ethoxylated $C_{12}$-$C_{22}$ triamine, ethoxylated $C_{12}$-$C_{22}$ tetraamine, ethoxylated $C_{12}$-$C_{22}$ diamine methylchloride quat, ethoxylated $C_{12}$-$C_{22}$ triamine methylchloride quat, ethoxylated $C_{12}$-$C_{22}$ tetraamine methylchloride quat, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine DDBSA salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quat, heptamethylated $C_{12}$-$C_{22}$ diamine quat, nonamethylated $C_{12}$-$C_{22}$ diamine quat, and combinations thereof.

In some embodiments, a suitable amine surfactant may have the general formula:

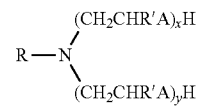

wherein R is a $C_{12}$-$C_{22}$ aliphatic hydrocarbon; R' is independently selected from hydrogen or $C_1$ to $C_3$ alkyl group; A is independently selected from NH or O, and x+y has a value greater than or equal to one but also less than or equal to three. Preferably, the R group is a non-cyclic aliphatic. In some embodiments, the R group contains at least one degree of unsaturation, i.e., at least one carbon-carbon double bond. In other embodiments, the R group may be a commercially recognized mixture of aliphatic hydrocarbons such as soya, which is a mixture of $C_{14}$ to $C_{20}$ hydrocarbons; or tallow, which is a mixture of $C_{16}$ to $C_{20}$ aliphatic hydrocarbons; or tall oil, which is a mixture of $C_{14}$ to $C_{18}$ aliphatic hydrocarbons. In other embodiments, one in which the A group is NH, the value of x+y is preferably two, with x having a preferred value of one. In other embodiments, in which the A group is O, the preferred value of x+y is two, with the value of x being preferably one. Commercially available surfactant examples include ETHOMEEN T/12, a diethoxylated tallow amine; ETHOMEEN S/12, a diethoxylated soya amine; DUOMEEN O, a N-oleyl-1,3-diaminopropane; DUOMEEN T, a N-tallow-1,3-diaminopropane; all of which are commercially available from Akzo Nobel at various locations.

In other embodiments, the surfactant may be a tertiary alkyl amine ethoxylate. TRITON RW-100 surfactant and TRITON RW-150 surfactant are examples of tertiary alkyl amine ethoxylates that are commercially available from Dow Chemical Company.

In other embodiments, the surfactant may be a combination of an amphoteric surfactant and an anionic surfactant. In some embodiments, the relative amounts of the amphoteric surfactant and the anionic surfactant in the surfactant mixture may be of about 30% to about 45% by weight of the surfactant mixture and of about 55% to about 70% by weight of the surfactant mixture, respectively. The amphoteric surfactant may be lauryl amine oxide, a mixture of lauryl amine oxide and myristyl amine oxide (i.e., a lauryl/myristyl amine oxide), cocoamine oxide, lauryl betaine, and oleyl betaine, or combinations thereof, with the lauryl/myristyl amine oxide being preferred. The cationic surfactant may be cocoalkyltriethyl ammonium chloride, and hexadecyltrimethyl ammonium chloride, or combinations thereof, with a 50/50 mixture by weight of the cocoalkyltriethyl ammonium chloride and the hexadecyltrimethyl ammonium chloride being preferred.

In other embodiments, the surfactant may be a nonionic surfactant. Examples of suitable nonionic surfactants include, but are not limited to, alcohol oxylalkylates, alkyl phenol oxylalkylates, nonionic esters, such as sorbitan esters, and alkoxylates of sorbitan esters. Examples of suitable surfactants include, but are not limited to, castor oil alkoxylates, fatty acid alkoxylates, lauryl alcohol alkoxylates, nonylphenol alkoxylates, octylphenol alkoxylates, tridecyl alcohol alkoxylates, such as polyoxyethylene ("POE")-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrastearate ethoxylate. Some suitable nonionic surfactants include alcohol oxyalkyalates such as POE-23 lauryl alcohol, and alkyl phenol ethoxylates such as POE (20) nonyl phenyl ether.

While cationic, amphoteric, and nonionic surfactants are thought to be most suitable, any suitable emulsifying surfactant may be used. Good surfactants for emulsification typically need to be either ionic, to give charge stabilization, to have a sufficient hydrocarbon chain length or cause a tighter packing of the hydrophobic groups at the oil/water interface to increase the stability of the emulsion. One of ordinary skill in the art, with the benefit of this disclosure, will be able to select a suitable surfactant depending upon the consolidating agent that is being emulsified. Additional suitable surfactants may include other cationic surfactants and even anionic surfactants. Examples include, but are not limited to, hexahydro-1 3,5-tris(2-hydroxyethyl)triazine, alkyl ether phosphate, ammonium lauryl sulfate, ammonium nonylphenol ethoxylate sulfate, branched isopropyl amine dodecylbenzene sulfonate, branched sodium dodecylbenzene sulfonate, dodecylbenzene sulfonic acid, branched dodecylbenzene sulfonic acid, fatty acid sulfonate potassium salt, phosphate esters, POE-1 ammonium lauryl ether sulfate, OE-1 sodium lauryl ether sulfate, POE-10 nonylphenol ethoxylate phosphate ester, POE-12 ammonium lauryl ether sulfate, POE-12 linear phosphate ester, POE-12 sodium lauryl ether sulfate, POE-12 tridecyl alcohol phosphate ester, POE-2 ammonium lauryl ether sulfate, POE-2 sodium lauryl ether sulfate, POE-3 ammonium lauryl ether sulfate, POE-3 disodium alkyl ether sulfosuccinate, POE-3 linear phosphate ester, POE-3 sodium lauryl ether sulfate, POE-3 sodium octylphenol ethoxylate sulfate, POE-3 sodium tridecyl ether sulfate, POE-3 tridecyl alcohol phosphate ester, POE-30 ammonium lauryl ether sulfate, POE-30 sodium lauryl ether sulfate, POE-4 ammonium lauryl ether sulfate, POE-4 ammonium nonylphenol ethoxylate sulfate, POE-4 nonyl phenol ether sulfate, POE-4 nonylphenol ethoxylate phosphate ester, POE-4 sodium lauryl ether sulfate, POE-4 sodium nonylphenol ethoxylate sulfate, POE-4 sodium tridecyl ether sulfate, POE-50 sodium lauryl ether sulfate, POE-6 disodium alkyl ether sulfosuccinate, POE-6 nonylphenol ethoxylate phosphate ester, POE-6 tridecyl alcohol phosphate ester, POE-7 linear phosphate ester, POE-8 nonylphenol ethoxylate phosphate ester, potassium dodecylbenzene sulfonate, sodium 2-ethyl hexyl sulfate, sodium alkyl ether sulfate, sodium alkyl sulfate, sodium alpha olefin sulfonate, sodium decyl sulfate, sodium dodecylbenzene sulfonate, sodium lauryl sulfate, sodium lauryl sulfoacetate, sodium nonylphenol ethoxylate sulfate, and/or sodium octyl sulfate.

Other suitable emulsifying agents are described in U.S. Pat. Nos. 6,653,436 and 6,956,086, both issued to Back, et al., the relevant disclosures of which are herein incorporated by reference.

In some embodiments, the emulsifying agent may function in more than one capacity. For example, in some embodiments, a suitable emulsifying agent may also be a hardening agent. Examples of suitable emulsifying agents that may also function as a hardening agent include, but are not limited to, those described in U.S. Pat. No. 5,874,490, the relevant disclosure of which is herein incorporated by reference.

In some embodiments, the emulsifying agent may be present in the consolidating agent emulsion in an amount in the range of about 0.001% to about 10% by weight of the consolidating agent emulsion composition. In some embodiments, the emulsifying agent may be present in the consolidating agent emulsion in an amount in the range of about 0.05% to about 5% by weight of the consolidating agent emulsion composition.

Optionally, a consolidating agent emulsion may comprise additional additives such as emulsion stabilizers, emulsion destabilizers, antifreeze agents, biocides, algaecides, pH control additives, oxygen scavengers, clay stabilizers, and the like, or any other additive that does not adversely affect the consolidating agent emulsion compositions. For instance, an emulsion stabilizer may be beneficial when stability of the emulsion is desired for a lengthened period of time or at specified temperatures. The emulsion stabilizer may be any acid. In some embodiments, the emulsion stabilizer may be an organic acid, such as acetic acid. In some embodiments, the emulsion stabilizer may be a plurality of nanoparticulates. If an emulsion stabilizer is utilized, it is preferably present in an amount necessary to stabilize the consolidating agent emulsion composition. An emulsion destabilizer may be beneficial when stability of the emulsion is not desired. The emulsion destabilizer may be, inter alia, an alcohol, a pH additive, a surfactant, or an oil. If an emulsion destabilizer is utilized, it is preferably present in an amount necessary to break the emulsion. Additionally, antifreeze agents may be beneficial to improve the freezing point of the emulsion. In some embodiments, optional additives may be included in the consolidating agent emulsion in an amount in the range of about 0.001% to about 10% by weight of the consolidating agent emulsion composition. One of ordinary skill in the art, with the benefit of this disclosure, will recognize that the compatibility of any given additive should be tested to ensure that it does not adversely affect the performance of the consolidating agent emulsion.

In some embodiments, a consolidating agent emulsion may further comprise a foaming agent. As used herein, the term "foamed" also refers to co-mingled fluids. In certain embodiments, it may be desirable that the consolidating agent emulsion is foamed to, inter alia, provide enhanced placement of a consolidating agent emulsion composition and/or to reduce the amount of aqueous fluid that may be required, e.g., in water-sensitive subterranean formations. Various gases can be utilized for foaming the consolidating agent emulsions of this invention, including, but not limited to, nitrogen, carbon dioxide, air, and methane, and mixtures thereof. One of ordinary skill in the art, with the benefit of this disclosure, will be able to select an appropriate gas that may be utilized for foaming the consolidating agent emulsions of the present invention. In some embodiments, the gas may be present in a consolidating agent emulsion of the present invention in an amount in the range of about 5% to about 98% by volume of the consolidating agent emulsion. In some embodiments, the gas may be present in a consolidating agent emulsion of the present invention in an amount in the range of about 20% to about 80% by volume of the consolidating agent emulsion. In some embodiments, the gas may be present in a consolidating agent emulsion of the present invention in an amount in the range of about 30% to about 70% by volume of the consolidating agent emulsion. The amount of gas to incorporate into the consolidating agent emulsion may be affected by factors, including the viscosity of the consolidating agent emulsion and wellhead pressures involved in a particular application.

In those embodiments where it is desirable to foam the consolidating agent emulsion, surfactants such as HY-CLEAN (HC-2)™ surface-active suspending agent, PEN-5™, or AQF-2™ additive, all of which are commercially available from Halliburton Energy Services, Inc., of Duncan, Okla., may be used. Additional examples of foaming agents that may be utilized to foam and stabilize the consolidating agent emulsions may include, but are not limited to, betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Other suitable foaming agents and foam-stabilizing agents may be included as well, which will be known to those skilled in the art with the benefit of this disclosure.

Figure 1F:
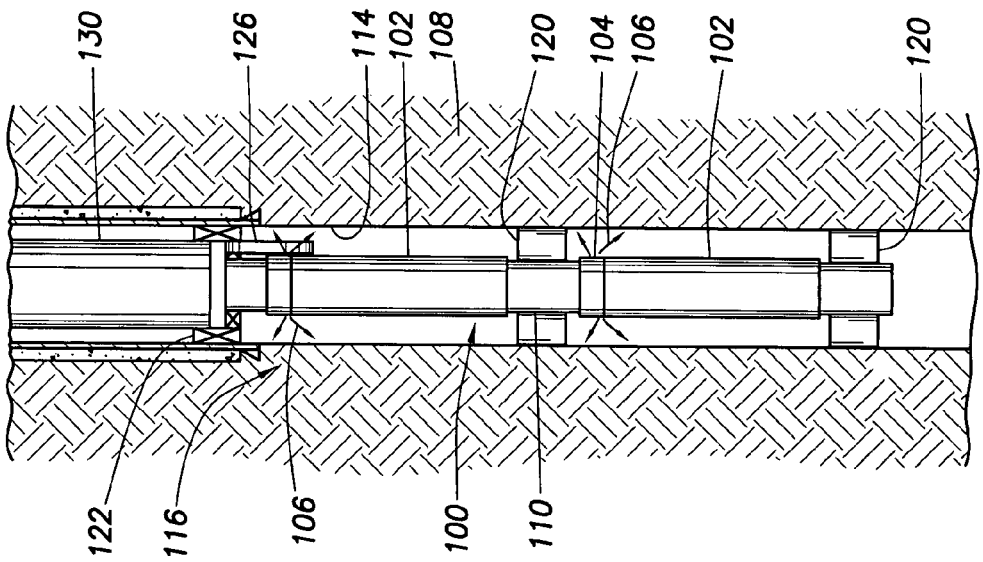
FIG. 1f is a side view of the embodiment of FIG. 1a, after placement of the consolidating agent system.
Figure 1H:
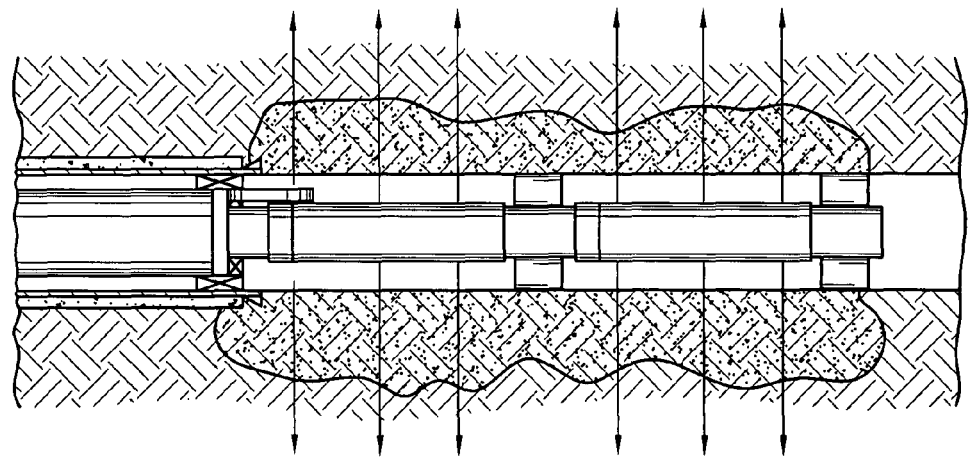
FIG. 1h is a side view of the embodiment of FIG. 1a, showing an injection operation.
Figure 1G:
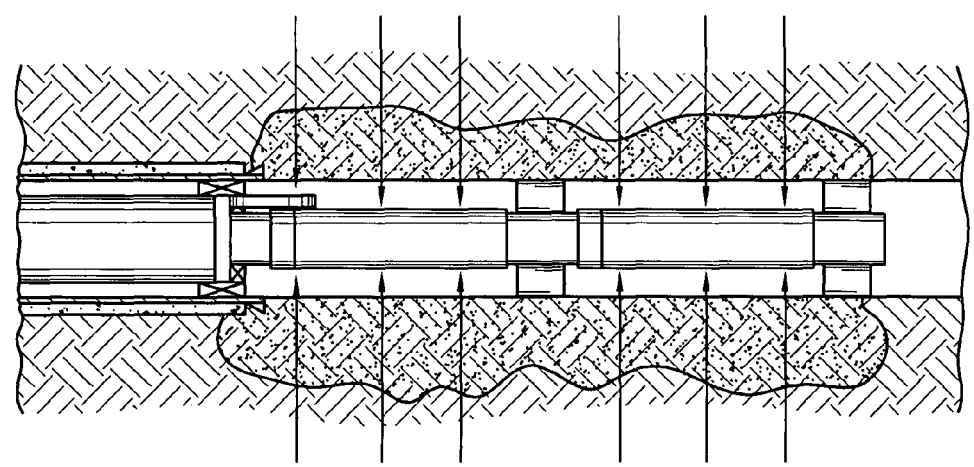
FIG. 1g is a side view of the embodiment of FIG. 1a, showing a production operation.

FIG. 1f illustrates consolidating agent system 106 in place after sufficient time has passed. Depending on the specific job, placing the well in service may include producing, with completion tubing 130 being production tubing, as illustrated by FIG. 1g. Alternatively, placing the well in service may include injecting, with completion tubing 130 being injection tubing, as illustrated by FIG. 1h.

While the embodiment of FIGS. 1a-1h shows filter cake degradation fluid 118 acting during the removal of service assembly 124, the embodiment of FIGS. 2a-2g illustrates an alternative method.

Figure 2B:
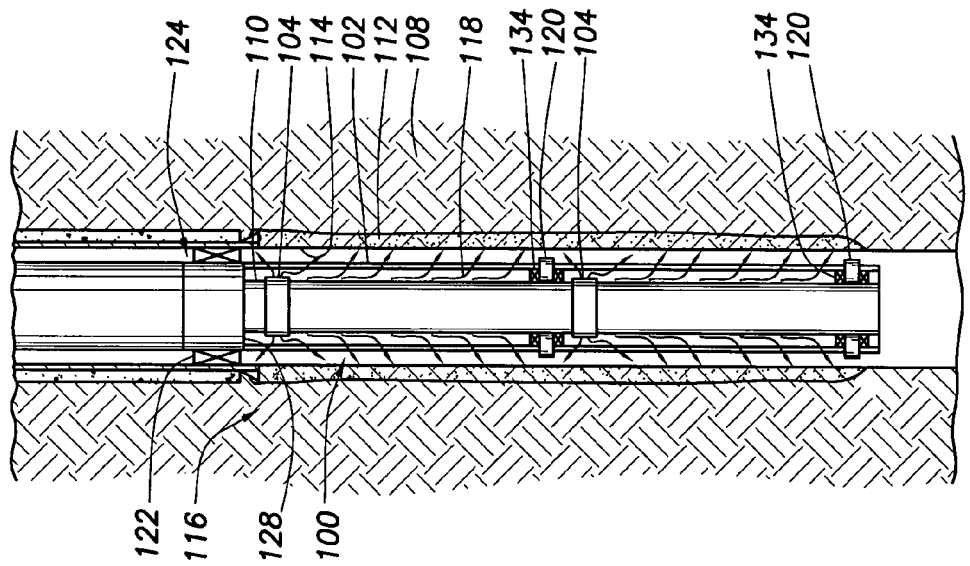
FIG. 2b is side view of the embodiment of FIG. 2a, showing placement of a filter cake degradation fluid.
Figure 2A:
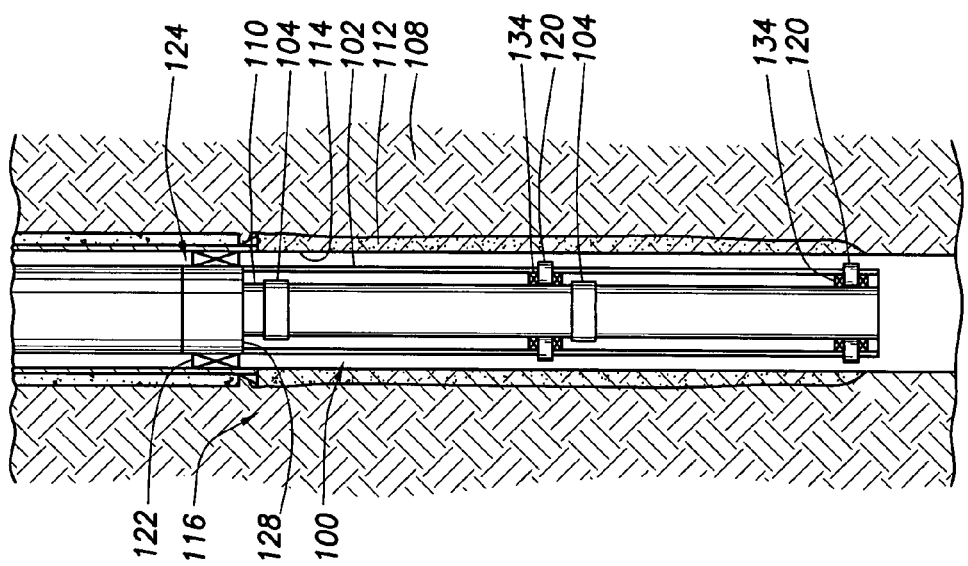
FIG. 2a is a side view showing another embodiment of a flow distribution system within a well bore.

In this embodiment, service assembly 124 may remain in place until after consolidating agent system 106 has been pumped into the formation. This allows borehole support assembly 102 to include a slotted liner, where wash pipe 110 may be removed. In this embodiment, borehole support assembly 102 may alternatively be a cemented casing with perforations. Thus, flow distributor 104 may be installed into a long perforated interval with cup packers 134 to distribute flow over the long interval. As illustrated in FIG. 2a, cup packers 134 may be used to selectively place flow. Filter cake degradation fluid 118 may be pumped through wash pipe 110, which includes flow distributor 104. After passing through flow distributor 104, filter cake degradation fluid 118 may pass through borehole support assembly 102 before coming into contact with filter cake 112.

Figure 2F:
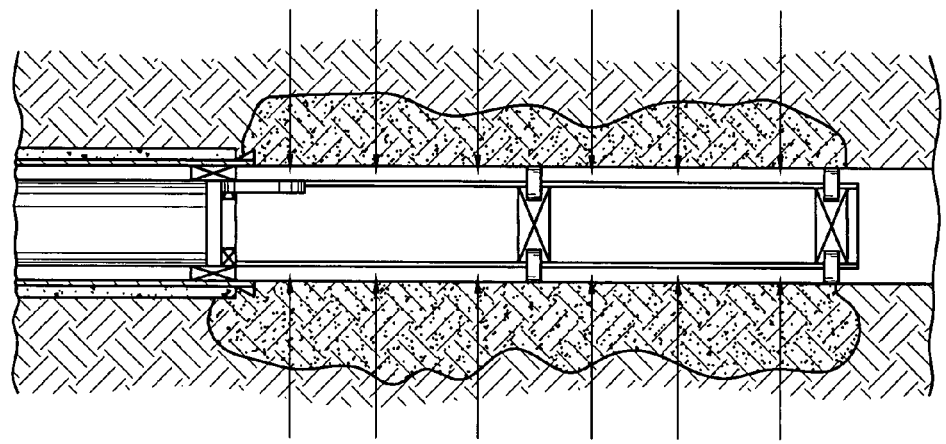
FIG. 2f is a side view of the embodiment of FIG. 2a, showing a production operation.
Figure 2E:
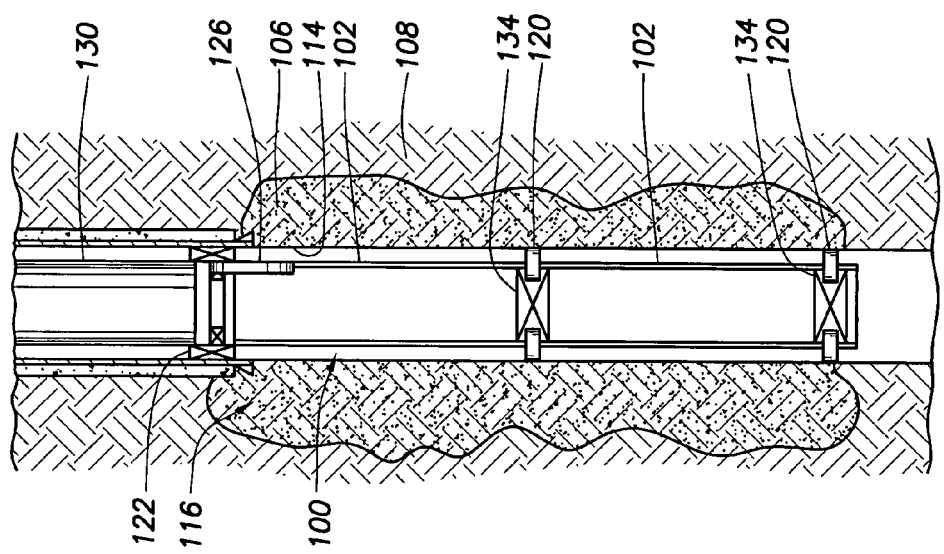
FIG. 2e is a side view of the embodiment of FIG. 2a, with completion tubing in place.
Figure 2G:
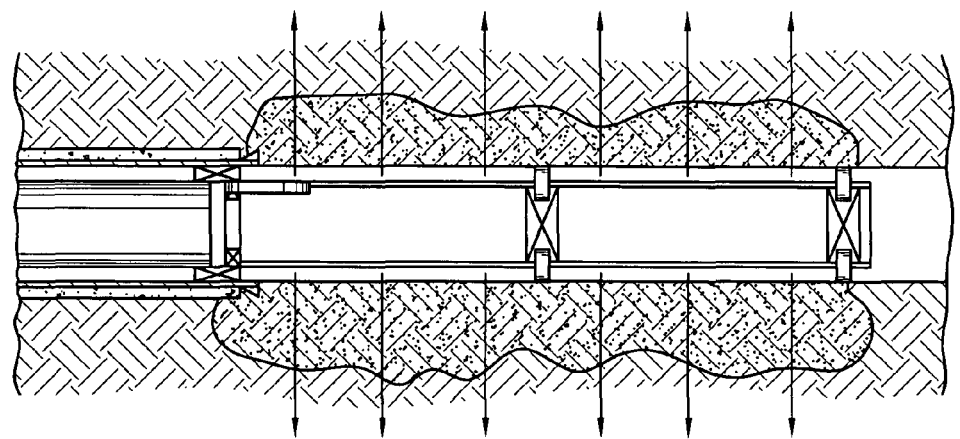
FIG. 2g is a side view of the embodiment of FIG. 2a, showing an injection operation.

After filter cake degradation fluid 118 is pumped, in embodiments where such a fluid is desirable, sufficient time must pass to allow filter cake 112 to be compromised and/or to allow annular barriers 120 to activate. As illustrated in FIG. 2c, consolidating agent system 106 may be pumped after filter cake 112 is compromised and annular barriers 120 are activated. After consolidating agent system 106 is placed, as illustrated in FIG. 2d, service assembly 124 may be removed and completion tubing 130 may be placed as illustrated in FIG. 2e. After completion tubing 130 is placed, the well may be placed in service. Depending on the specific job, placing the well in service may include producing, with completion tubing 130 being production tubing, as illustrated by FIG. 2f. Alternatively, placing the well in service may include injecting, with completion tubing 130 being injection tubing, as illustrated by FIG. 2g.

Figure 3A:
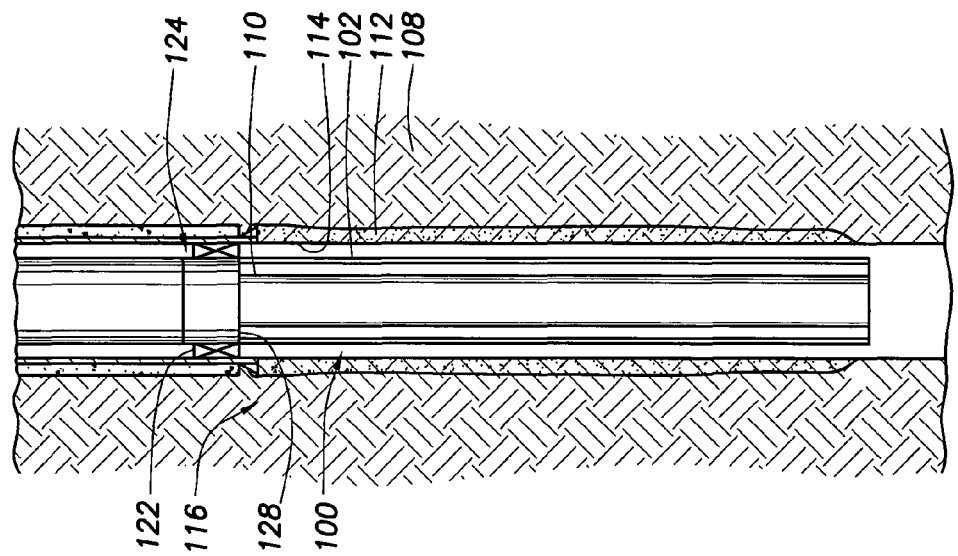
FIG. 3a is a side view showing yet another embodiment of a flow distribution system within a well bore.

Yet further alternative methods involve self-degrading filter cakes that do not require filter cake degradation fluid 118. Referring to FIG. 3a, flow distribution system 100, including wash pipe 110 and borehole support assembly 102, may be supported by suspension tool 122. Self-diverting fluid 132 flows into the space between wash pipe 110 and borehole support assembly 102, and out through borehole support assembly 102 as illustrated in FIG. 3b. Self-diverting fluid 132 may be placed after flow distribution system 100, and essentially divert subsequent flow away from high permeability sections, allowing a more uniform flow to be obtained, which may allow for effective treatment of the entire well bore.

Figure 3G:
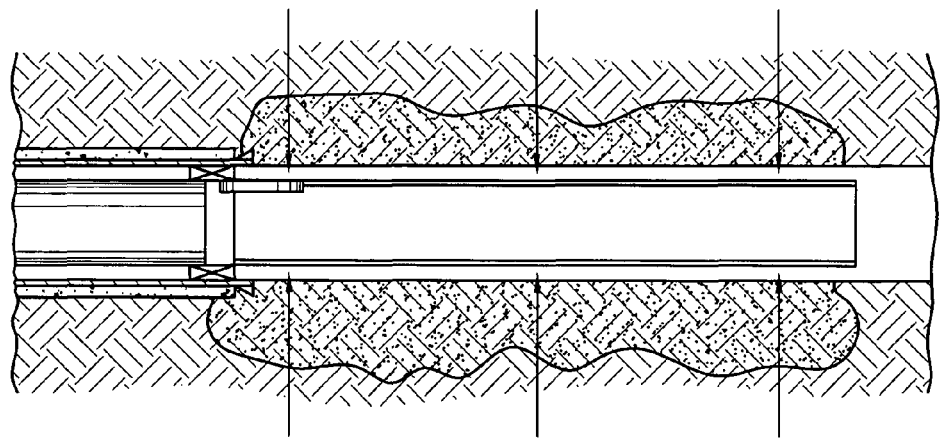
FIG. 3g is a side view of the embodiment of FIG. 3a, showing a production operation.
Figure 3F:
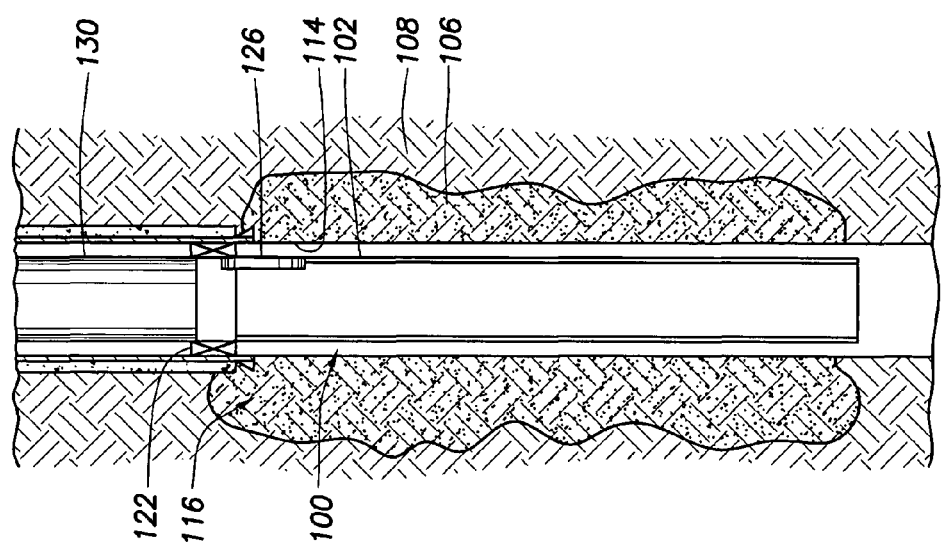
FIG. 3f is a side view of the embodiment of FIG. 3a, with completion tubing in place.
Figure 3H:
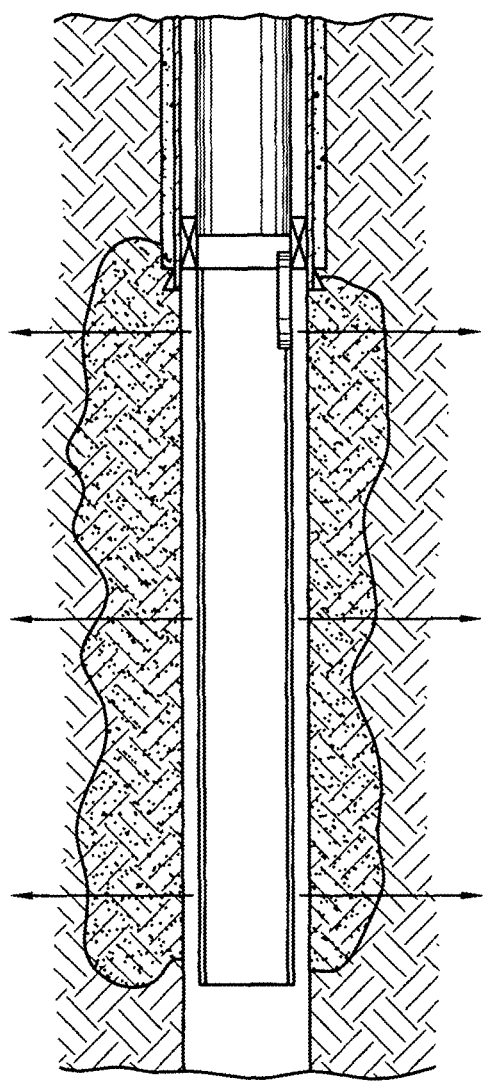
FIG. 3h is a side view of the embodiment of FIG. 3a, showing an injection operation.

In some instances, it may be desirable to take partial returns 136 of consolidating agent system 28. Taking at least partial returns 136 helps ensure exposure to the entire borehole. Self-diverting fluid 132 may equalize flow into reservoir 108, allowing flow distributors 104 to be omitted. For example, at least about 5% returns may help ensure full zone coverage. FIG. 3c illustrates the passage of sufficient time to compromise filter cake 112. FIG. 3d illustrates consolidating agent system 106 as it is placed. FIG. 3e illustrates consolidating agent system 106 in place. Service assembly 124 may be pulled out of the hole, leaving fluid loss valve 126 closed to prevent losses. Circulation may remove excess treating fluids from the well and completion tubing 130 may be run, as illustrated in FIG. 3f. With completion tubing 130 in place, the well may be placed in service. Depending on the specific job, placing the well in service may include producing, with completion tubing 130 being production tubing, as illustrated by FIG. 3g. Alternatively, placing the well in service may include injecting, with completion tubing 130 being injection tubing, as illustrated by FIG. 3h. In one embodiment, annular barriers 120 may be added, such that they may be activated after consolidating agent system 106 has been placed.

In yet another embodiment, flow distributors 104 may be used to place self-diverting fluid 132 over the desired interval. The diversion properties of self-diverting fluid may allow for uniform treatment over a long interval. In this embodiment, annular compartmentalization is not required unless, in some instances for example, it might be desirable to isolate shale that cannot be treated. Therefore, as with the embodiment of FIGS. 3a-3h, annular barriers 120 may optionally be omitted.

Filter cake 112 may be removed using filter cake degradation fluid 118, allowing time for filter cake 112 to degrade. Filter cake degradation fluid 118 may also be used to activate annular barriers 120 for shale isolation if desired. Consolidating agent system 106 may be placed using self-diverting fluid 132. Consolidating agent system 106 may then be squeezed using flow distribution system 100 to distribute over the entire interval. Service assembly 124, including wash pipe 110, may be pulled out, leaving fluid loss valve 126 closed to prevent losses. Completion tubing 130 may be installed, and the well may be placed in service. If annular barriers 120 are used and were not activated pre-treatment, they may be activated during production of the well to isolate any exposed shale.

Consolidating agent system 106 may be placed along entire well bore 114, or any portion thereof. A majority of the interval may be treated in some instances. A majority means at least about 50% of a chosen interval. Note that not all steps are always required; for instance, one might choose not to isolate the shale or when consolidating agent system 106 is placed during drilling, there is no need to remove filter cake 112.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art, having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims and the description, are defined herein to mean one or more than one of the element that it introduces. Also, the terms in the claims have their plain, ordinary meaning unless otherwise explicitly and clearly defined by the patentee.

What is claimed is:

1. A method comprising:
providing a well bore comprising an open hole section of about 30 feet or more that comprises a filter cake neighboring at least a portion of a reservoir in a subterranean formation;
placing a flow distribution system in the open hole section, the flow distribution system comprising a plurality of annular barriers configured for selective activation;
wherein the annular barriers act to isolate selective areas of the open hole wellbore either hydrostatically, hydraulically, mechanically, inflatably, or through contact with an activating material;
compromising the integrity of the filter cake by placing a filter cake degradation fluid in contact with at least a portion of the filter cake wherein the filter cake degradation fluid comprises at least one chosen from the group consisting of: an acid precursor; an oxidizer; an oxidizer precursor; a base; an enzyme; and any combination thereof;
activating at least one of the annular barriers; and,
placing a consolidating agent system into the formation along the open hole section so as to at least partially consolidate formation particulates along the open hole section, wherein the consolidating agent system comprises a consolidating agent chosen from the group consisting of: an aqueous tackifying agent, a silyl-modified polyamide compound, a crosslinkable aqueous polymer composition, a polymerizable organic monomer composition, and any combination thereof;
wherein the formation particulates in the open hole section of about 30 feet or more are consolidated without the use of a gravel pack.

2. The method of claim 1, wherein the filter cake is at least partially self-degrading due to the presence of at least one self-degrading bridging agent that comprises a degradable material chosen from the group consisting of: an ortho ester; a poly(orthoester); an aliphatic polyester; a lactide; a poly(lactide); a glycolide; a poly(glycolide); a poly(s-caprolactone); a poly(hydroxybutyrate); a substantially water-insoluble anhydride; a poly(anhydride); and a poly(amino acid).

3. The method of claim 1, wherein the open hole section is about 50 feet or more.

4. The method of claim 1, wherein the open hole section is about 100 feet or more.

5. The method of claim 1, wherein a chemical reaction of the filter cake degradation fluid is involved in activating the annular barriers.

6. The method of claim 1, further comprising placing the well in service, which involves producing from the well, injecting into the well, or producing from the well and injecting into the well.

7. The method of claim 1, wherein at least one of the annular barriers comprises an annular isolation device.

8. The method of claim 7, wherein the annular isolation device responds to a fluid present within the subterranean formation to substantially isolate at least a portion of the open hole section.

9. The method of claim 1, wherein the consolidating agent system comprises a pre-flush fluid, a post-flush fluid, or a pre-flush fluid and a post-flush fluid.

10. A method comprising:
providing a well bore comprising an open hole section of about 30 feet or more that comprises a filter cake neighboring at least a portion of a reservoir in a subterranean formation;
placing a flow distribution system in the open hole section, the flow distribution system comprising a plurality of annular barriers configured for selective activation;
wherein the annular barriers act to isolate selective areas of the open hole wellbore either hydrostatically, hydraulically, mechanically, inflatably, or through contact with an activating material;
compromising the integrity of at least a portion of the filter cake by placing a filter cake degradation fluid in contact with at least a portion of the filter cake wherein the filter cake degradation fluid comprises at least one chosen from the group consisting of: an acid precursor; an oxidizer; an oxidizer precursor; a base; an enzyme; and any combination thereof; and
treating at least a portion of the open hole section with a consolidating agent system that is at least placed into a portion of the subterranean formation along the open hole section in a single stage operation so as to at least partially reduce formation particulate migration in the open hole section, wherein the consolidating agent system comprises a consolidating agent chosen from the group consisting of: an aqueous tackifying agent, a silyl-modified polyamide compound, a crosslinkable aqueous polymer composition, a polymerizable organic monomer composition, and any combination thereof;

wherein the formation particulates in the open hole section of about 30 feet or more are consolidated without the use of a gravel pack.

11. The method of claim 10, wherein the filter cake is at least partially self-degrading.

12. A method comprising:

providing a well bore comprising an open hole section of about 100 feet or more that comprises a filter cake neighboring a reservoir in a subterranean formation;

placing a flow distribution system in the open hole section, the flow distribution system comprising a plurality of annular barriers configured for selective activation;

wherein the annular barriers act to isolate selective areas of the open hole wellbore either hydrostatically, hydraulically, mechanically, inflatably, or through contact with an activating material;

compromising the integrity of at least a portion of the filter cake by placing a filter cake degradation fluid in contact with at least a portion of the filter cake wherein the filter cake degradation fluid comprises at least one chosen from the group consisting of: an acid precursor; an oxidizer; an oxidizer precursor; a base; an enzyme; and any combination thereof; and placing a consolidating agent system into the subterranean formation along at least a portion of the open hole section in a single stage operation so as to at least partially reduce formation particulate migration in a portion of the open hole section, wherein the consolidating agent system comprises a consolidating agent chosen from the group consisting of: an aqueous tackifying agent, a silyl-modified polyamide compound, a crosslinkable aqueous polymer composition, a polymerizable organic monomer composition, and any combination thereof;

wherein the formation particulates in the open hole section of about 30 feet or more are consolidated without the use of a gravel pack.

13. The method of claim 12, further comprising placing the well in service.

14. The method of claim 12, wherein the filter cake is at least partially self-degrading.

15. The method of claim 12, wherein the step of allowing the integrity of the filter cake to become compromised involves placing a filter cake degradation fluid in contact with at least a portion of the filter cake.

16. The method of claim 12 further comprising activating the annular barriers before the integrity of the filter cake becomes substantially compromised.

* * * * *